June 14, 1932.  C. BOREL  1,863,097
INSTALLATION FOR REGISTERING DATA BY PERFORATION
BY MANUAL AND AUTOMATIC MEANS
Filed Dec. 15, 1924    10 Sheets-Sheet 1
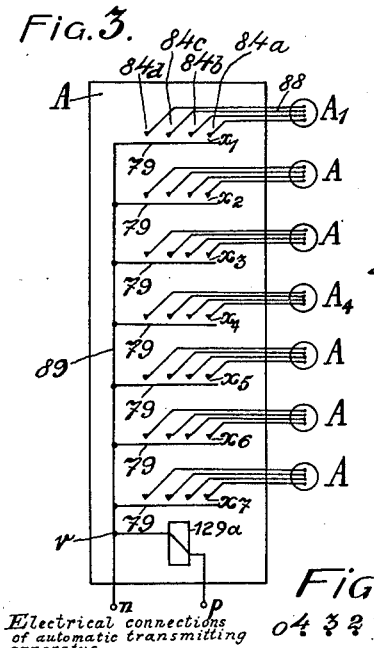
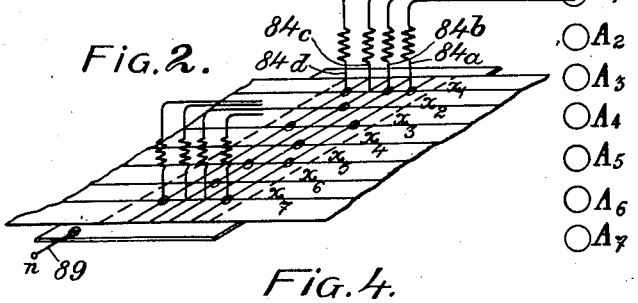
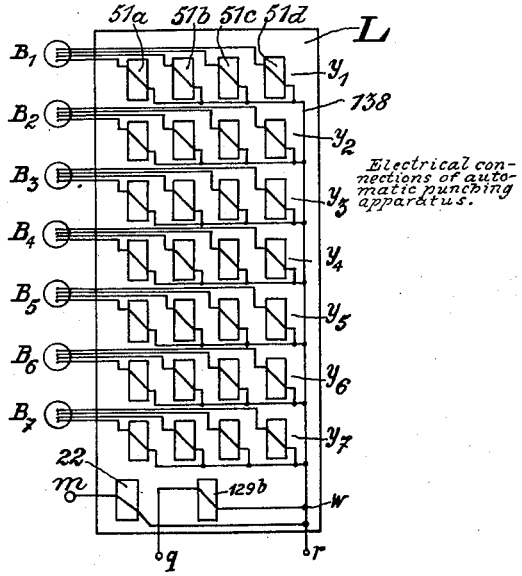
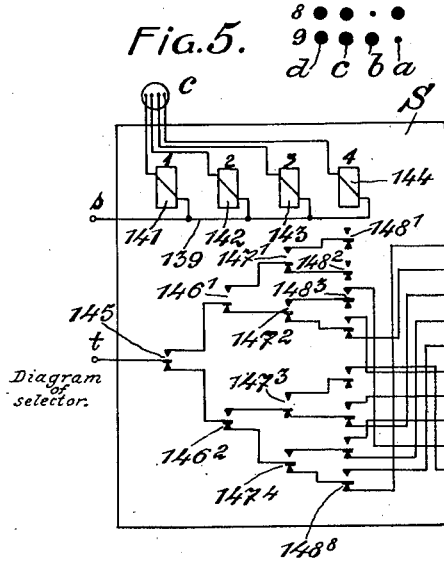
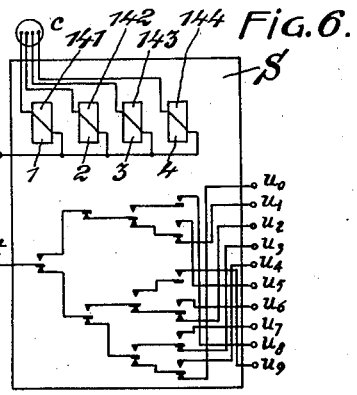
Inventor:—
Charles Borel
by [signature]
Atty.

June 14, 1932. C. BOREL 1,863,097
INSTALLATION FOR REGISTERING DATA BY PERFORATION
BY MANUAL AND AUTOMATIC MEANS
Filed Dec. 15, 1924    10 Sheets-Sheet 2
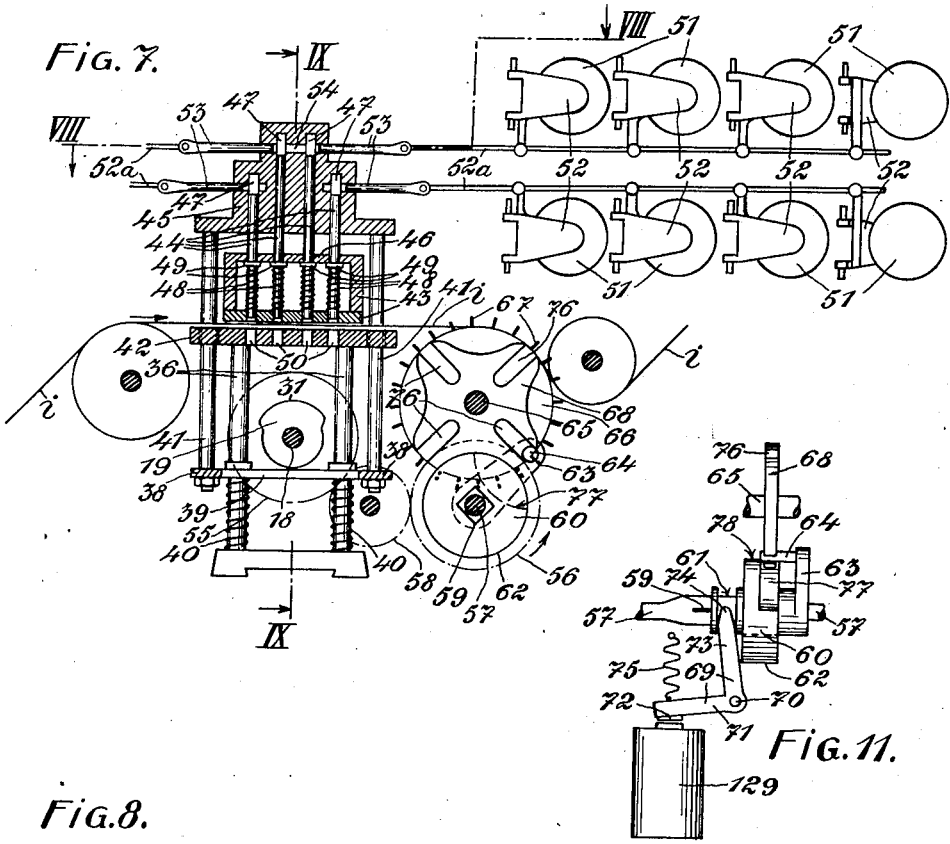
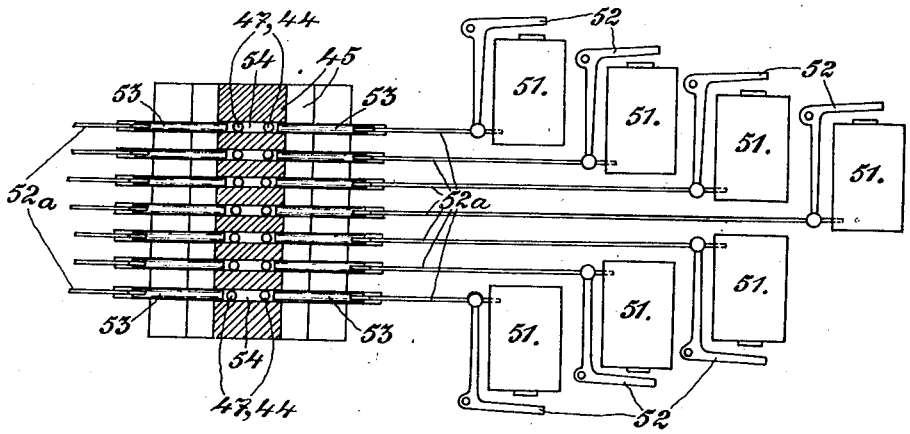
Inventor:-
Charles Borel
by [signature]
Atty.

June 14, 1932.   C. BOREL   1,863,097
INSTALLATION FOR REGISTERING DATA BY PERFORATION
BY MANUAL AND AUTOMATIC MEANS
Filed Dec. 15, 1924   10 Sheets-Sheet 3
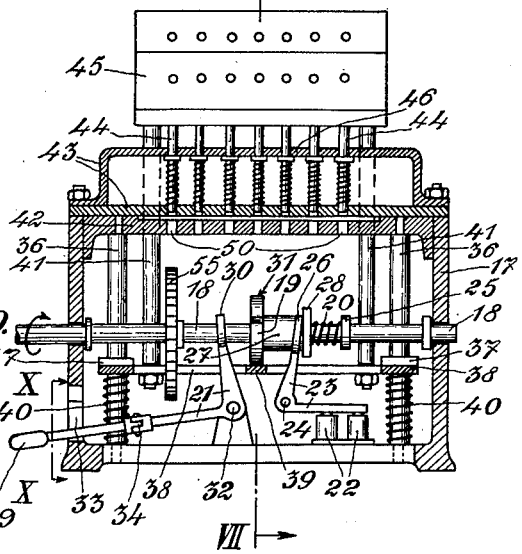
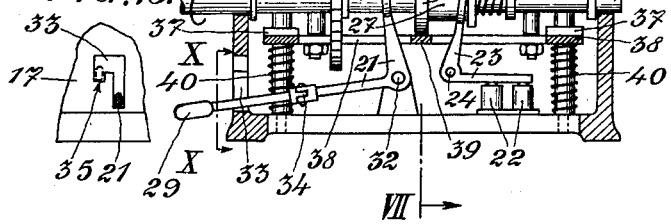
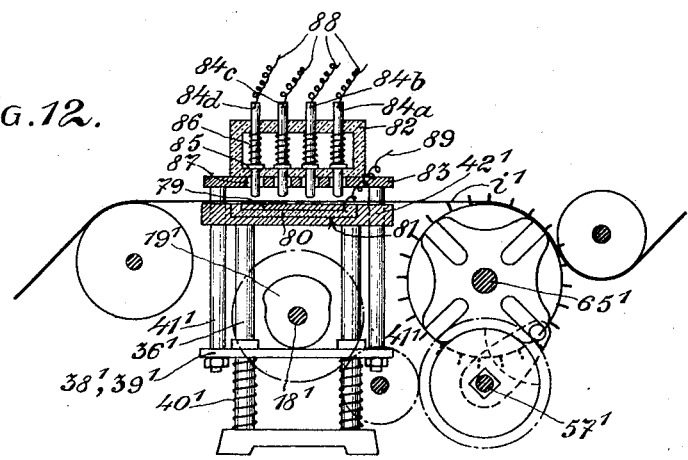
Inventor:-
Charles Borel.
by E. P. Wunderoth
Atty.

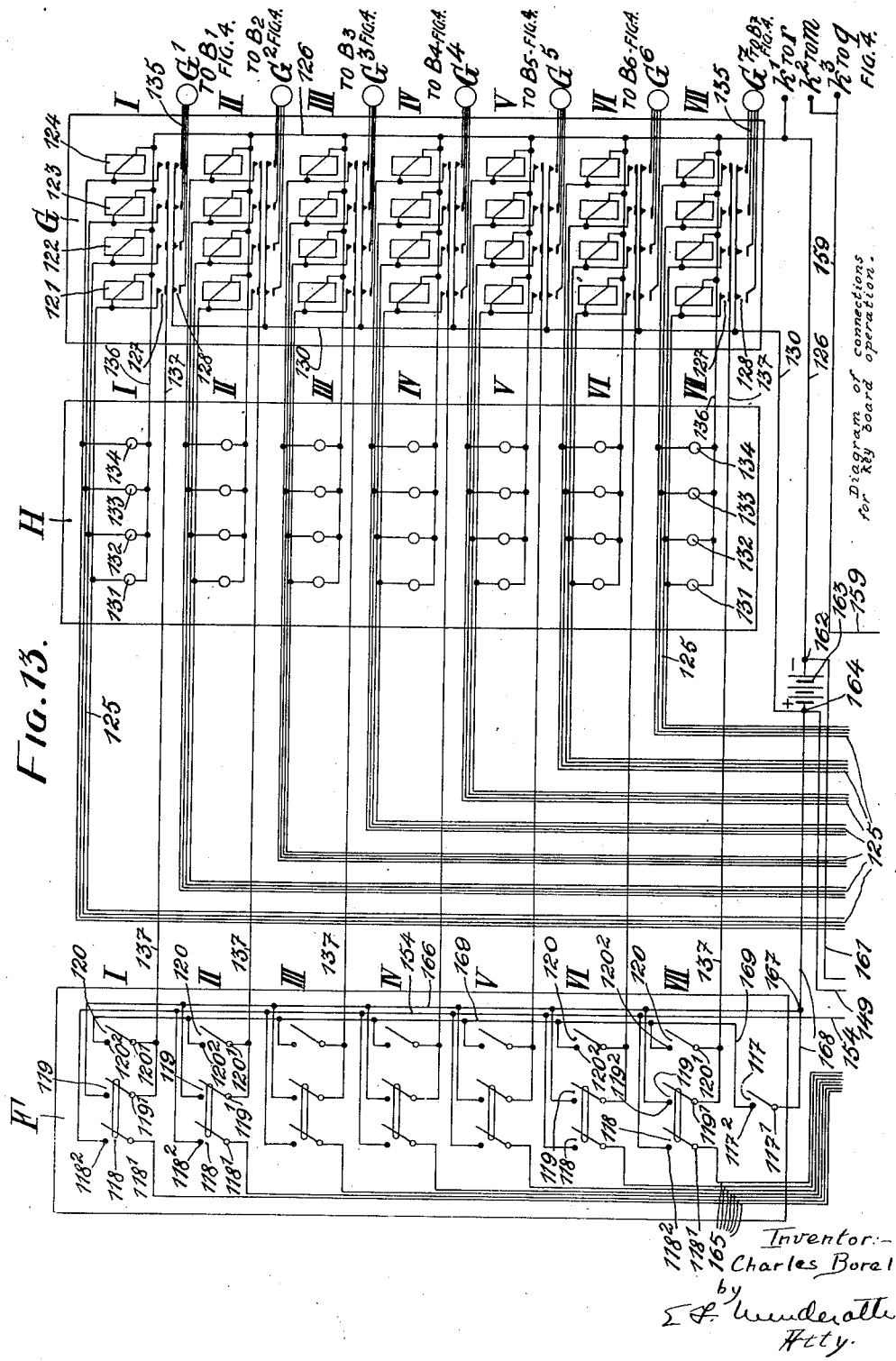

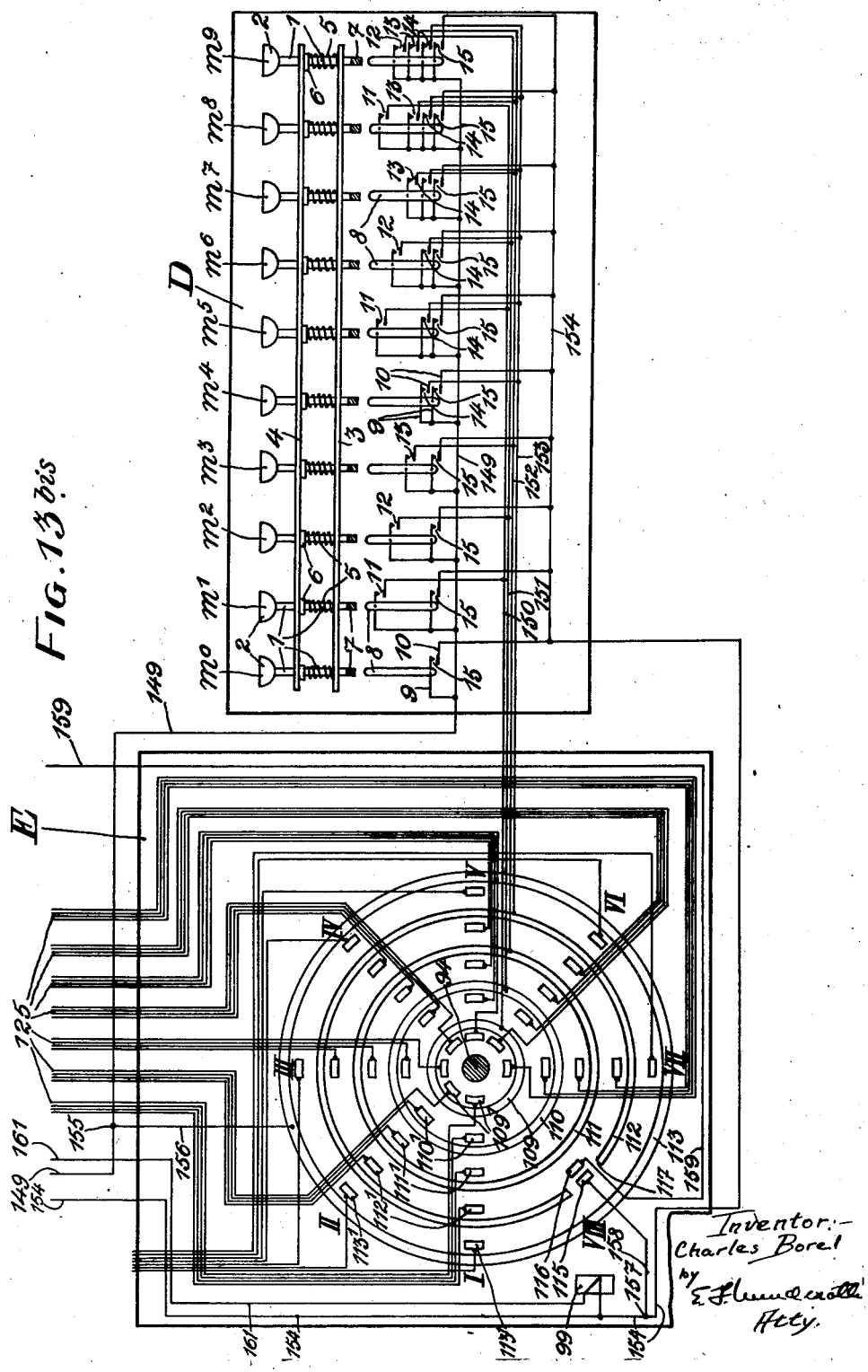

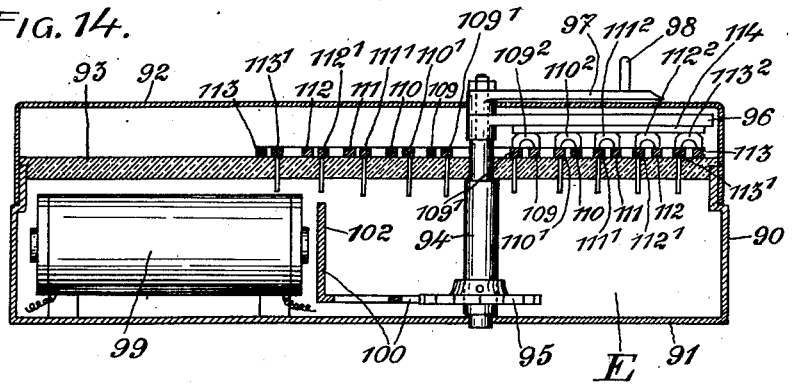
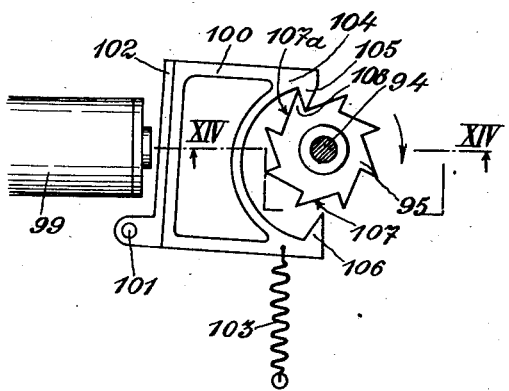

Fig. 17.

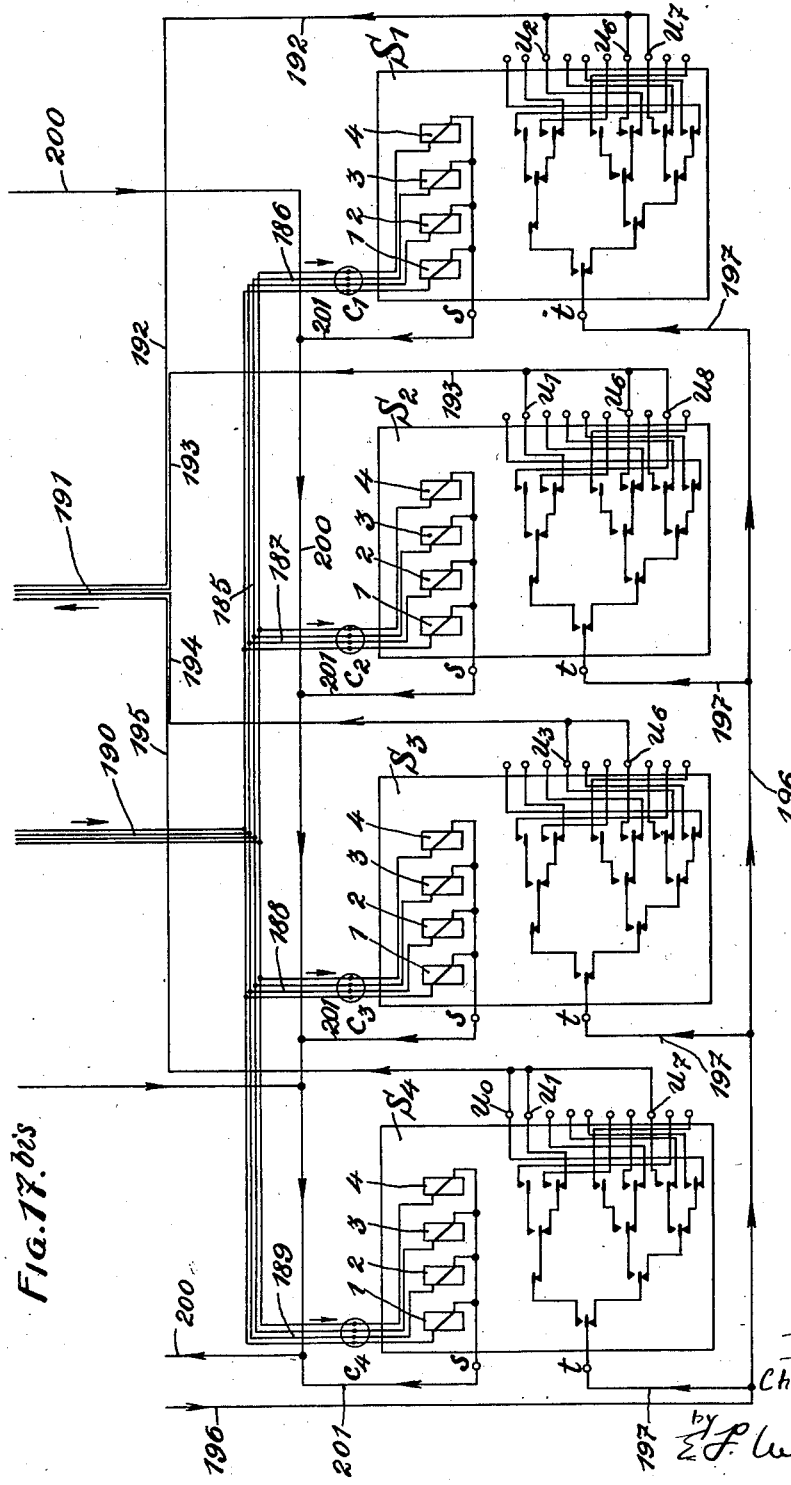

Patented June 14, 1932

1,863,097

UNITED STATES PATENT OFFICE

CHARLES BOREL, OF CHENE-BOUGERIES, NEAR GENEVA, SWITZERLAND

INSTALLATION FOR REGISTERING DATA BY PERFORATION BY MANUAL AND AUTOMATIC MEANS

Application filed December 15, 1924, Serial No. 756,169, and in Switzerland December 24, 1923.

The present invention refers to an installation for recording data by perforation on cards formed in strips. This recording may be effected by either of the following two methods:

1. By means of an operator operating a keyboard;
2. Automatically from a strip previously perforated (either manually by means of a keyboard or automatically).

*Turning to the 1st method—by means of the keyboard*

The following apparatus are necessary:
1 keyboard D;
1 automatic perforating or punching apparatus L; and 1 controlling apparatus comprising:
1 multiple switch E,
1 group of switches F,
1 relay board G,
1 control (verifying) board H.

*2nd method—automatically*

The following apparatus are necessary:
1 automatic apparatus for reading the data recorded by perforation K.
1 automatic perforating or punching apparatus L.
1 or several selectors S.

The accompanying drawings represent by way of example a constructional form of each of the above-mentioned apparatuses and contain as well a diagrammatic view of the entire installation when used according to the first method indicated above. Three examples of using the automatic operating installation are also shown.

Figure 16:
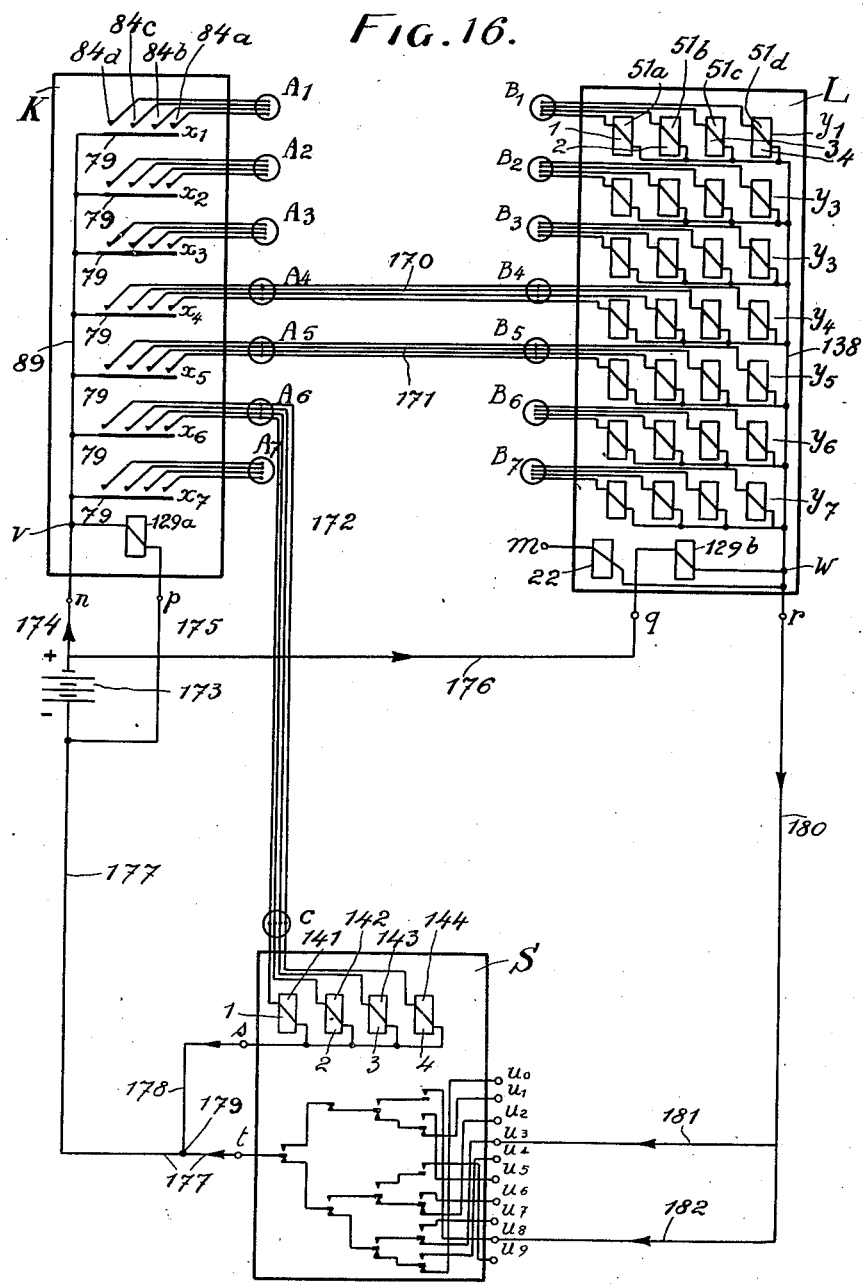
Figure 18:
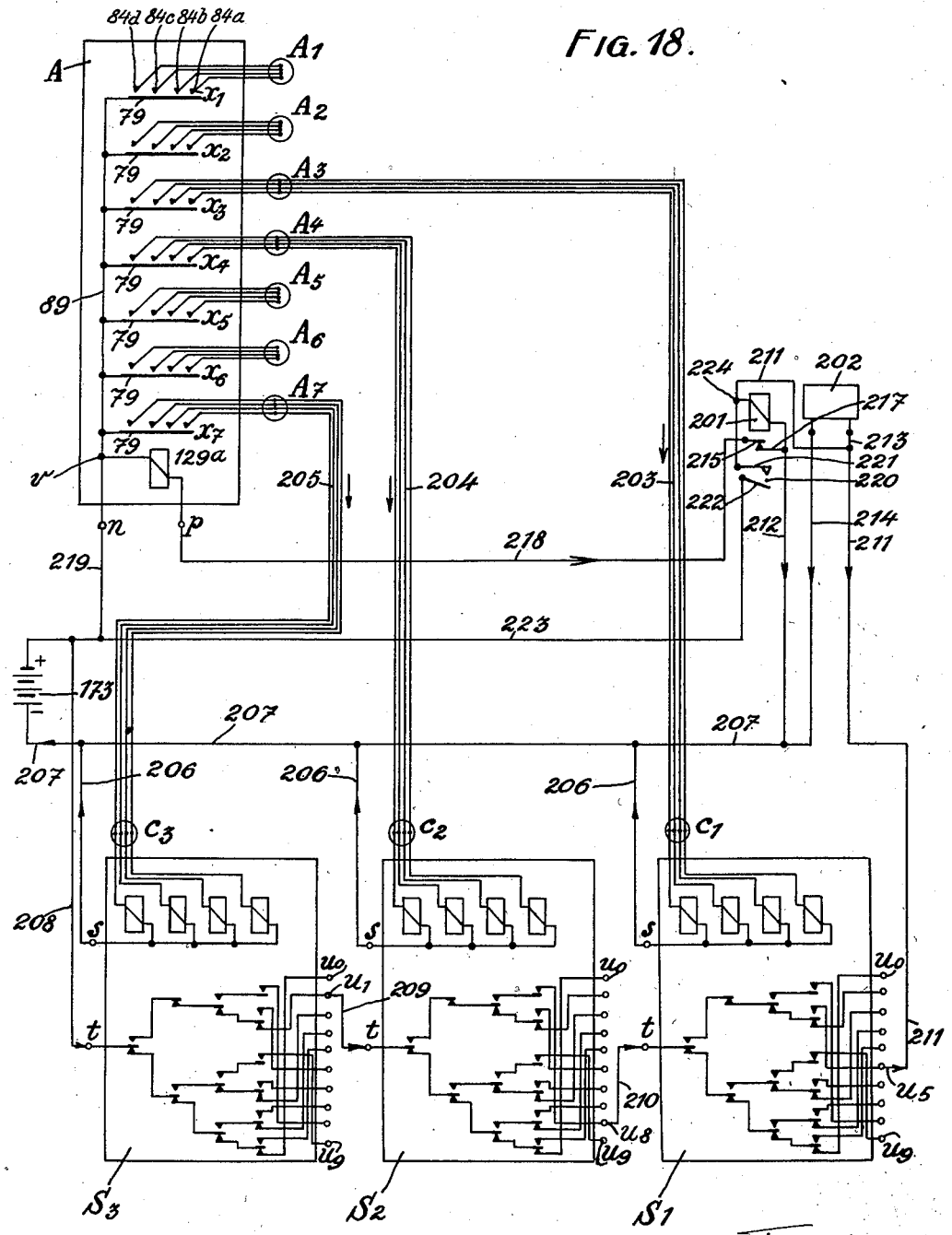

Fig. 1 shows the code employed for representing and recording the data;
Fig. 2 shows diagrammatically the reading of data recorded on a card of a strip;
Fig. 3 is a diagram of the electrical connections of the automatic reading apparatus;
Fig. 4 is a diagram of the electrical connections of the automatic perforating apparatus;
Fig. 5 is a diagram of the principle of a selector of the type employed here;

Fig. 6 is a diagrammatic view of the selector employed in the diagrams;
Fig. 7 is a section according to VII—VII of Fig. 9 of the perforating apparatus;
Fig. 8 is a plan view with partial section according to VIII—VIII of Fig. 7 of this perforating apparatus.
Fig. 9 is a longitudinal section of the same perforating apparatus according to IX—IX of Fig. 7;
Fig. 10 is a detail view according to X—X of Fig. 9;
Fig. 11 is a detail view of the mechanism producing the advance step by step of the strip in the perforating apparatus; this mechanism is also employed in the reading apparatus;
Fig. 12 is a cross section of the reading apparatus;
Figs. 13 and 13' show the diagram of the connections in the case of the installation being employed for recording data by means of an operator and the keyboard;
Fig. 14 is an axial section view of the multiple switch shown diagrammatically in Fig. 13';
Fig. 15 is a partial plan view corresponding to Fig. 14 and showing the mechanism with electric control producing the automatic rotation of the multiple switch of Fig. 14;
Fig. 16 is a diagram of the connections of the installation in a first example of use for the automatic recording of data by perforation on cards of a strip;
Figs. 17 and 17' are diagrams of the connections of the installation in a second example of use for the automatic recording of data by perforation on cards of a strip; while
Fig. 18 is a diagram of the connections of the installation in a third example of use of the automatic operating installation corresponding to the automatic search for a card having certain determined characteristics of movement.

It is hereinafter assumed that strips of paper, for example, are used, each of which constitutes a series of cards in juxtaposition. Each card is adapted to record data or a group of data. There may be 7 lines $x_1 x_2 \ldots x_7$ each of which may contain zero, one, two, three or four perforations (Fig. 2). Each digit of the data is recorded on a line corresponding to the code represented in Fig. 1. If the data has several digits, there must be as many lines as there are digits. One line corresponds to each "denomination" of the data.

The code according to Fig. 1 shows the combinations of perforations employed for representing the digits 0 to 9. Each of the 4 points or holes $a$, $b$, $c$ and $d$ of a line may be termed a "position". The 4 positions $a$, $b$, $c$, $d$ of a line have the values 1, 2, 3 and 4 respectively. The value 7 is therefore represented by a perforation in the "positions" 3 and 4 since $3+4=7$. In the same manner 8 is represented by $1+3+4=8$; etc.

In the various figures for facilitating the reading, the values 1, 2, 3, 4 of the "positions" have beeen indicated above or on the corresponding contacts or electromagnet where it has been deemed necessary. The various apparatuses of the installation will now be described separately after which the manner in which the installation is used will be explained and then the examples of using the installation will be described.

*Perforating or punching apparatus E*

The new Figs. 4 and 7–10 represent the perforating or punching apparatus E.

This apparatus has a frame 17 (Fig. 9) through which a shaft 18 extends, driven by a motor not shown. The said shaft has a cam 19 rotating with it but adapted to be axially displaced along the shaft between two extreme positions. The said cam is urged by a spring 20 to remain (or to return) in the extreme position on the left in Fig. 9 (which is the inoperative position). It may be brought in the extreme position on the right (shown in Fig. 9), which is the operative position, either under the control of a bell crank lever 21 or under the control of an electromagnet 22 acting on a bell crank lever 23 pivoted to its crank at 24. The spring 20 bears against an abutment 25 of the shaft 18 and pushes back the cam to the inoperative position as soon as the electromagnet 22 has ceased to act. The bell crank lever 23 has at one of its ends a bifurcated member 26 extending around a cylindrical part 27 integral with the cam and having a shoulder or collar 28 against which the bifurcated member 26 of the lever 23 bears when the electromagnet 22 is energized so as to move the cam toward its operative position (i. e. toward the right in Fig. 9).

The lever 21 permits the cam 19 to be brought into the operative position and to be maintained therein. This lever has a small handle 29 at one of its ends and a bifurcated member 30 at its other end. The member 30 extends around the shaft 18 and acts axially on the cam 19 for bringing it into operative position when the said lever is moved clockwise about the pivot 32.

The part of the lever 21 having the small handle extends through a cutout portion 33 of the frame 17 and has a joint 34 permitting a lateral movement of the small handle so as to enable the lever 21 to engage in the slot 35 (Fig. 10) of the cutout portion in such manner that it then remains in that position, the cam being in the operative position, (on the right in Fig. 9). In Figs. 9 and 10 the lever 21 is shown in the inoperative position.

In the interior of the frame 17 there are four vertical columns 36 having an abutment 37 between their ends. A horizontal frame 38 having a middle cross member 39 is adapted to slide along the lower part of the said columns. The frame 38 is urged to remain (or to return) in the upper position, wherein it bears against the abutments or stops 37, by the springs 40 disposed around the columns 36.

When the cam 19 is in the operative position (Fig. 9) it is located exactly above the cross part 39 and its projecting member 31 bears during each rotation of the shaft 18 against the cross part so as to move the frame 38 downwardly. The columns 36 guide the frame 38 during its movements and the springs 40 bring it into the upper position as soon as the projecting member 31 of the cam 19 ceases to act.

In the inoperative position, the cam 19 is not opposite the part 30. It therefore no longer acts thereon and the frame 38 remains immovable notwithstanding the rotation of the cam.

Four vertical bars 41 are fixed to the frame 38 which slide during the movements of the latter in holes of a plate 42 carried by the frame 17. The bars 41 have at their upper end a yoke 45 which they entrain in such a manner that it moves vertically and integrally with the frame 38.

Above the plate 42 is a fixed box 43 in which are provided a certain number (seven in the example shown) of groups of punches. Each group forms a line $y_1$ $y_2$ ... $y_7$ of 4 punches 44. The lower ends of the punches are engaged in the holes of the lower part of the box 43. The upper end of each of these punches extends through a hole of the upper part 46 of the box 43 and engages in a corresponding cylindrical hole 47 (Fig. 7) of the yoke.

The springs 48 (Fig. 7) act on the collars or shoulders 49 of the punches for maintaining or bringing the latter into their upper position. The lower end of each punch is arranged opposite a hole 50 extending through the plate and in which it may penetrate when the punch is lowered, as will be seen hereinafter.

Electromagnets 51 of a number equal to that of the punches are arranged on both sides of the yoke as shown in Figs. 7 and 8 (only those on one side are shown). Each of these electromagnets has its armature 52 connected to an end of a rod 52ª which is linked at its other end to a plunger 53 partially engaged in a horizontal hole 54 of the yoke. Each of the holes 54 extends to the upper part of one of the vertical holes 47 of the yoke slightly above the point where the upper end of the punch 44 is located when the yoke is in the upper position. A plunger 53 therefore corresponds to each punch 44.

When the yoke effects its vertical movement to and fro and no electromagnet 51 is energized, the punches remain immovable and the plungers are then in their extreme external position with regard to the yoke. If on the contrary certain electromagnets 51 are energized they attract their armature 52 whereby the corresponding plunger 53 is advanced in its hole 54, through the medium of the rod 52ª which is fixed therein, to a position above the punch 44 engaging in the vertical hole 47 wherein the horizontal hole 54 extends. When a plunger has been thus advanced, it occupies such a position that when the yoke descends the corresponding punch is obliged to follow it owing to the plunger which abuts against it and carries it along.

All the punches corresponding to the momentarily energized electromagnets are therefore locked while this excitation lasts and engage in the holes 50 of the plate after they have each made a hole in the strip *i* which extends between the plate and the box 43.

The feeding of the card after card of the strip *i* is effected by means of the feeding mechanism shown in Figs. 10 and 11. As this mechanism is the same for the perforating apparatus and for the reading apparatus, the corresponding parts are designated by the same reference characters in Figs. 7, 12 and 11.

The driving shaft (18 for the perforating apparatus and 18' for the reading apparatus) rotates regularly and is entrained by the motor of the installation. The said shaft has a toothed wheel 55 keyed thereon which entrains through the medium of a pinion 58 another toothed wheel 56 keyed to a shaft 57. The latter shaft has a square member 59 on which may be moved axially a member 60 having a groove 61, a central part 62 and an arm 63 having a finger 64 at its end.

As the motor operates, the member 60 rotates regularly with the shaft 57.

There is mounted on a shaft 65 parallel to the shaft 57 a drum 66 with pins 67 over which the strip *i* passes, the pins cooperating with marginal holes of the said strip in the same manner as is done with a film in a cinematographic apparatus. The shaft 65 has also fixed to it a grooved maltese cross 68 adapted to cooperate with the finger 64 and the central part 62 of the member 60.

The member 60 is controlled or operated by a crank lever 69 (Fig. 11) pivoted at 70. This lever has at the end of its arm 71 the armature 72 of an electromagnet 129. The end of the other arm 73 has a bifurcated member 74 cooperating with the sides of the groove 61 for axially displacing the member 60 when the bell crank lever 69 rotates. A spring 75 urges this lever to rotate clockwise for bringing the member 60 in its extreme position on the right in Fig. 11 (in this figure, the member 60 is in the extreme position on the left).

The electromagnet 129 causes the lever 69 to rotate counter-clockwise when it is energized thereby bringing the member 60 in its extreme position on the left in Fig. 11 notwithstanding the pull of the spring 75. The electromagnet 129 is supposed to be energized in Fig. 11.

The central part 62 of the member 60 is of cylindrical shape. Its length is such that according to the path of the member 60 its lateral wall is always opposite the periphery of the maltese cross. As already stated, the shaft 57 rotates regularly and the maltese cross is normally immovable.

When the electromagnet 129 is not energized, the member 60 is in an inoperative position i. e. the shaft 57 and the maltese cross are independent. When on the contrary the electromagnet 129 is energized, the member 60 is brought into the operative position wherein it connects momentarily the shaft 57 and the maltese cross through the medium of the finger 64.

When the member 60 is in the operative position, the finger 64 is in such a position that during the rotation (counter-clockwise according to Figs. 7 and 12) it engages in one of the slots 76 of the maltese cross and entrains the latter for causing it to make a quarter of a revolution. For this purpose, the central member 60 has a cutout portion 77 in the part opposite the periphery of the cross when the member 60 is in the operative position. The cutout portion has for its object to permit the rotation of the cross, the arms thereof being free to rotate when the cutout portion 77 is opposite thereto.

When the member 60 is in the inoperative position, the finger 64 cannot engage in the slots 76 and the maltese cross is maintained immovable owing to the cutout portion 77 being no longer opposite thereto but on the contrary the solid cylindrical part 78 which while rotating prevents the rotation of the arms of the cross.

In the schematic diagrams, the electromagnet of the feeding mechanism for the strip is indicated at 129*a* for the reading apparatus and at 129*b* for the perforating or punching apparatus.

Fig. 4 shows the perforating apparatus diagrammatically from an electrical point of view only. This figure shows the seven groups $y_1 \ldots y_7$ of 4 electromagnets $51a$ $51b$ $51c$ $51d$ corresponding to the 7 lines of punches of Figs. 7 and 9.

The 4 electromagnets of each group $y_1 \ldots y_7$ are connected on the one hand by one of their terminals to 4 poles of one of the 7 four-pole jacks $B_1 \ldots B_7$ and are connected on the other hand by their other terminal to one common conductor 138 terminating at a unipolar jack $r$. There is also shown in this figure the electromagnet $129b$ adapted to control the feed of the strip in the perforating apparatus. This electromagnet is connected by one of its terminals to the unipolar jack $q$ and by the other terminal to the point $w$ of the conductor 138.

Fig. 4 also shows the electromagnet 22 controlling the cam 19 (see Fig. 9). One of the terminals of this electromagnet is connected to a unipolar jack $m$ while its other terminal is connected to the conductor 138.

*Reading apparatus K*

Fig. 12 is an end view of the reading apparatus. Its construction differs only in principle from that of the perforating or punching apparatus by the fact that the punches are replaced by electric contact members (feeler pins) of a number equal to that of the punches of the perforating apparatus. In order to avoid useless repetition, the parts already described with reference to Figs. 7 and 9 are indicated in Fig. 12 by the same reference numerals as in these Figs. 7 and 9, but are followed by the index 1.

Contrary to what has taken place for the perforating apparatus, the cam $19'$ is fixed on the shaft $18'$ in such a position that it acts during each rotation by its projecting member on the cross piece $39'$ of the frame $38'$. In this case there is no electromagnet and bell crank lever for displacing the cam axially as is the case for the perforating apparatus.

The plate $42'$ is not perforated. It presents a metallic plate 79 carried by an insulating member 80 fixed in a recess 81 of the plate. The strip $i'$ passes on this metallic plate and momentarily stops a card of this strip during each rotation of the driving shaft.

Directly above the plate 79 is a box 82 of insulating material carried by a member 83 fixed to the upper end of vertical bars $41'$ secured to the frame $38'$. This box 82 therefore performs during each rotation of the driving shaft a complete vertical movement to and fro under the control of the cam $19'$. In this box 82 are disposed the seven rows of contact members (feeler pins) 84. One of these rows is visible in the figure. It comprises 4 contact members $84a$, $84b$, $84c$, $84d$. In Figs. 2 and 3, $x_1$ $x_2$ $\ldots$ $x_7$ are the different rows.

Each of the members 84 has between its two ends a collar 85 serving as a support for a spring 86 bearing on the other side against an upper wall of the box 82 for pushing the member 84 downward. The upper and lower ends of the members 84 extend freely through the upper and lower walls of the box 82. The lower end of each of the members 84 also extends through a hole 87 of the member 83 which is large enough so that there is no contact between the member 84 and the member 83. The lower part of the members 83 protrudes opposite the plate 79 against which these members abut when the cam $19'$ lowers the box 82.

The upper end of the members 84 extends through the upper wall of the box 82 and to each of them is connected a conductor 88. A conductor 89 is connected to the plate 79.

Fig. 3 shows the reading apparatus diagrammatically from an electrical point of view only. This figure shows the seven rows $x_1 \ldots x_7$ of contact members 84. The 4 contact members 84 of each row or line $x_1$ $x_2 \ldots x_7$ have been represented as profile views; the plate 79 against which the said members bear has therefore been shown for each of these lines. The plate 79 is connected to a unipolar jack $n$ by the conductor 89. Each of the 4 contact members 84 of one and the same line $x_1$ $x_2 \ldots x_7$ is connected to one of the poles of a four-pole jack $A_1$ $A_2 \ldots A_7$. There is therefore a four-pole jack for each line.

Fig. 3 also shows the electromagnet $129a$ controlling the feed of the strip in the reading apparatus. One of the terminals of this electromagnet is connected at V to the conductor 89 while the other is connected to a unipolar jack $p$. Fig. 2 illustrates diagrammatically the principle of the reading apparatus.

The reading apparatus operates in the following manner: in each phase, all the contact members 84 are lowered on the cards of the strip $i'$ momentarily immovable on the plate 79. Those of the members which pass through a hole of the said card come in contact with the plate 79 which completes a circuit. Those which are however not opposite a hole of the card are kept out of contact with the plate 79 by the said card (see Fig. 2).

After being lowered, the contact members are brought back to the upper position and the strip may advance (or remain immovable as the case may be) until the following card is on the plate 79. This constitutes an operating cycle and corresponds to one rotation of the driving shaft. Another cycle begins with the next rotation.

Manually operated apparatus for the perforation of the strips

It comprises the following 5 devices:
The keyboard D,
The multiple switch E,
The group of switches F,
The relay board G,
The control (verifying) board H.

Figs. 13 and 13' represent the electrical diagram of these devices and their reciprocal connection. In order to make this diagram clearer, these various devices have been shown as if they were separated. It is understood that in practice they may either form a unit or be grouped in several units depending upon convenience. The electric connections between the five devices forming the apparatus under consideration are shown as being fixed, contrary to that which is necessary for the connections between the apparatus of the installation which may readily be modified at will.

Keyboard D (Fig. 13')

It comprises 10 keys $m_0 \ldots m_9$ corresponding respectively to the values 0, 1, 2, ... 8, 9. Each key comprises a cylindrical member 1 and a head 2. The member 1 is adapted to slide axially in two holes formed opposite each other in two bottom plates 3 and 4. Springs 5 are arranged between the said two plates around each key and bear against the plate 3 for urging the keys to remain (or to return) in the upper position by acting on a collar 6 of these keys. The lower end of each of the keys has a member 7 of insulating material adapted to act on the corresponding one of ten parts 8 for closing corresponding contacts upon depression of the key.

The contacts controlled or operated by the keys each comprise a movable elastic metallic plate 9 and a fixed plate 10. The plates 9 are connected mechanically by the member 8 which is of insulating material so that when depressing a key, the corresponding member 8 is moved downward and entrains all the plates 9 which are fixed there so that they come respectively in contact with a plate 10 and close in pairs with the plates 10 one at least of the contacts 11, 12, 13, 14, 15.

The depression of a certain key produces the closing of the contacts corresponding to the value which this key represents according to the code (Fig. 1) because 11, 12, 13 and 14 correspond respectively to the "positions" 1, 2, 3 and 4 of the code. The depression of any key always produces the closing of a contact 15.

The plates 9 of the contacts 11, 12, 13, 14, 15 are all connected to one common conductor 149 which terminates at the positive pole 164 of the battery 163 (Fig. 13). The plates 10 of the contacts 11, 12, 13, 14 and 15 of the various keys are connected respectively to the five conductors 150, 151, 152, 153 and 154. Consequently, all the plates 10 of the contacts 11 are connected to 150, those of the contacts 12 are connected to 151, those of the contacts 13 to 152 etc.

Multiple switch E (Figs. 13', 14 and 15)

The multiple switch may comprise (Fig. 14) a box 90 formed of two parts 91 and 92 fitting one over the other. In the interior of this box is a plate 93 of insulating material carrying contact plugs which will be hereinafter more fully described. This plate is fitted and fixed over the edge of the member 91 and also serves in conjunction with the base of the member 91 for holding a shaft 94 in the interior of the box to which shaft are secured: a toothed wheel 95 provided for feeding the shaft and a radial arm 96 carrying contact members adapted as will be seen later for cooperating with the contact plugs of the plate 93. This shaft also carries on the outside of the box 90 a second radial arm 97 having a handle 98 and serving for the manual operation of the said shaft.

At the base of the member 91 is fixed an electromagnet 99 and a member 100 of magnetic material which pivots horizontally at 101 (Fig. 15) and which has a part 102 constituting the armature of the electromagnet 99. A biasing spring 103 urges the member 100 to rotate clockwise (Fig. 15). The electromagnet 99 tends to rotate the member 100 in the opposite direction against the action of the spring.

The member 100 has a part 104 having the general shape of a C with teeth 105 and 106 respectively at its two ends. These two teeth are adapted to cooperate with the teeth of the wheel 95 for causing it to rotate in the following manner:

The member 100 is arranged in such a manner that normally the tooth 105 engages with the teeth of the wheel as shown in Fig. 15 and the other tooth 106 occupies a position almost diametrically opposite to the tooth 105 with relation to the center of the wheel without being in engagement with the teeth of the wheel. When the electromagnet 99 is energized, the member 100 rotates counter-clockwise, the tooth 105 leaves the teeth of the wheel and the tooth 106 abuts against the inclined plane 107 of a tooth almost halfway between the face and the root of this tooth. Under the action of the force of attraction exerted by the electromagnet on the member 102, the tooth 106 slides along the inclined plane 107 while compelling the wheel to make a half rotation clockwise after which the tooth 106 having reached the base of the teeth remains immovable until the excitation of the electromagnet 99 ceases. When this excitation ceases, the spring 103 causes the member 100 to rotate clockwise, thereby releasing the tooth 106 and bringing the tooth 105 against the teeth of the wheel. Owing to the aforesaid rotation of this wheel under the action of the tooth 106, the tooth 105 encounters the inclined plane 107a of the tooth 108 almost halfway between the face and the root of this tooth. Under the action of the spring 103, the tooth 105 exerts a pressure on this inclined plane 107a whereby the wheel 95 makes a half rotation clockwise i. e. until the tooth has again reached the base of the teeth as shown in Fig. 15.

Consequently, each time the electromagnet 99 is energized and subsequently is deenergized, there results a complete rotation of the wheel 95. The shaft 94 participates in this rotation. The number of teeth of the wheel is such that in the particular case in question, eight consecutive excitations and de-excitations of the electromagnet 99 cause a complete rotation. Arranged concentrically to the shaft 94 are five annular contact members 109, 110, 111, 112 and 113 on the upper face of the plate 93 (Fig. 14). These contact members are shown in plan view in Fig. 13' without showing the radial arm 96. In the same figure, the 8 positions, radial and equidistant, which the said arm 96 may occupy are indicated by I; II, III ... VII, VIII. Opposite to each of the positions I to VII five contact plugs 109', 110', 111', 112' and 113' are fixed to the plate 93 on a radial line, each adjacent to one of the annular members 109 ... 113. The member 113 is connected at 155 to the conductor 149 by a wire 156. To the member 109, 110, 111, and 112 are connected respectively, the conductors 150, 151, 152, 153.

The arm 96 (Fig. 14) has on its lower face a plate of insulating material 114 to which are fixed five electric brushes $109^2$, $110^2$, $111^2$, $112^2$, $113^2$. These five brushes are insulated from each other and are also insulated from the arm 96; they are in the form of a reversed U. The brushes $109^2$ ... $113^2$ are arranged in such a manner that in each of the positions I ... VII they come in contact through one of their ends with the plugs 109' ... 113' and through their other end with the members 109 ... 113. In this manner, for each of the positions I ... VII the brushes $109^2$ ... $113^2$ connect electrically in pairs, the plug 109' and the member 109, the plug 110' and the member 110, the plug 111' and the member 111, the plug 112' and the member 112, the plug 113' and the member 113.

In the position VIII there are no plugs 109' ... 113' adapted to cooperate with the members 109 ... 113. On the other hand, there are two plugs 115 and 116 which are arranged so as to be connected electrically together by a brush of the arm 96 when this arm is in the position VIII. In the special case, it is admitted that the brush $112^2$ is adapted to connect 115 and 116 (the member 112 being interrupted at 117).

The plug 115 is connected at 157 to the conductor 154 by the wire 158. The plug 116 is connected by a conductor 159 to two unipolar jacks $k_2$ and $k_3$ (Fig. 13). The electromagnet 99 is shown diagrammatically in Fig. 13' and is connected by one of its terminals to the conductor 154 at 160; its other terminal is connected by conductor 161 to the negative terminal 162 of the battery 163.

A bundle of 4 conductors 125 starts from each group of 4 plugs 109' 110' 111' 112' corresponding to the different positions I II ... VII. Each of the four conductors starts from one of the 4 plugs in question. There are therefore 7 bundles of these conductors.

The purpose of the operation of the multiple switch E will be explained later.

*Group of switches F (Fig. 13)*

The group of switches F in Fig. 13 comprises 7 rows I, II ... VII of switches plus an individual switch 117.

Each row I, II ... VII comprises three switches: 118, 119, 120. The switches 118 and 119 of the same row constitute a double switch; they are connected mechanically (but not electrically) together so as to be displaced or moved simultaneously.

The terminals 118' of the switches 118 of the various rows I, II ... VII are connected, each by a conductor 165, to the plugs 113 corresponding to the different positions I, II ... VII of the multiple switch E. The other terminal $118^2$ of the various switches 118 is connected to the common conductor 154.

The two terminals 119' and 120' of the two switches 119 and 120 of the same row I or II, III ... VII are both connected to the same conductor 137. There is therefore one conductor 137 for each row I ... VII.

The terminals $119^2$ of the switches 119 are connected to one common conductor 166 which is connected at 167 to a conductor 168 which connects the terminal of the positive pole of the battery 163 to the terminal 117' of the switch 117. A conductor 169 leads from the terminal $117^2$ of the switch 117 and the terminals $120^2$ of the various switches 120 are connected to the said conductor.

*Relay board G (Fig. 13)*

The relay board G of Fig. 13 comprises 7 rows I, II ... VII of 4 relays 121, 122, 123, 124 each. At one of the terminals of the 4 relays 121 ... 124 of the rows I, II ... VII terminates those of the 4 conductors 125 which come from the plugs 109' 110' 111' 112' corresponding to the positions I, II ... VII of the multiple switch E. In other words, the plugs 109' ... 112' of the positions I II ... VII correspond respectively to the electromagnets 121 ... 124 of the rows I II ... VII. The other terminal of the said electromagnets is connected (through the medium of conductors 136) to a common conductor 126 terminating at the negative terminal 162 of the battery 163. Each of the relays 121 ... 124 controls or operates two contacts 127, 128. The fixed member of a contact is hereinafter denominated that part of the latter which remains practically immovable during the operation of the relay, and is represented by a small, solid triangle; the movable member of a contact is hereinafter denominated that part of the latter which is controlled or operated by the armature of the relay, and is represented by a short, solid horizontal stroke of appreciable thickness.

The movable part of the contacts 127 of one and the same row I, II ... VII of 4 relays is connected to the common wire 137 coming from the rows I, II ... VII of switches of the group F. Each row of G corresponds to a row of F.

The fixed part of each contact 127 is connected to the terminal of the relay on which the particular contact depends and at the point where that wire 125 which corresponds to the said relay ends.

The fixed part of each of the contacts 128 is connected to a common conductor 130. The movable part of each contact 128 of the same group of relays I, II ... VII is connected by a conductor 135 to one of the four poles of a four-pole jack $G_1$ or $G_2$ ... $G_7$. Each of these seven jacks corresponds to the four contacts 128 of one of the rows of relays.

Control (verifying) board H

The control or verifying board H of Fig. 13 comprises seven rows I ... VII of four lamps 131, 132, 133, 134 each.

One of the poles of each of these lamps is connected to the common conductor 126 through the medium of conductors 136. The other pole of each of these lamps is connected to one of the conductors 125 in such a manner that the lamps 131, 132, 133, 134 of the row I are connected respectively to the same conductors 125 as the relays 121, 122, 123, 124 of the row I; the same applies to the rows II ... VII.

Selector S (Figs. 5 and 6)

The electric diagram of the selector employed which selector is known per se is shown in Fig. 5. It comprises 4 electromagnets 141, 142, 143, 144 each connected by one of its terminals to one of the poles of a four-pole jack C and by its other terminal to a common conductor 139 connected to a unipolar jack s.

The role of the selector is as follows:

To receive data in the form of current, according to the code, through the jack C (i. e. through conductors terminating at a four-pole plug which cooperates with the said jack) so that according to the value of the data thus received, any one or several of the 4 electromagnets are energized and attract their corresponding armatures (not shown). These armatures control or operate contacts which are arranged so as to complete, for each value received through the selector, (i. e. for each combination of zero, one, two, three or four energized electromagnets) a distinct circuit or a portion of a circuit.

There are 16 possible combinations according as none, one, two, three or four electromagnets are energized. Fig. 5 indicates in a general manner the arrangement of the principle of the contacts of the complete selector i. e. capable of receiving 16 data each represented by one of the 16 combinations in question. The decimal system is practically employed more frequently i. e. the group of four electromagnets receives one of the ciphers 0, 1 ... 9 which is represented by one of the 10 combinations as indicated in Fig. 1. Fig. 6 shows the simplified arrangement corresponding to the latter case.

With reference to Fig. 5:

In this figure, only the connections used for the decimal system are shown.

The armature of the electromagnet 141 controls the movable part of an alternate contact 145 which is connected to a unipolar jack $t$.

The armature of the electromagnet 142 controls the movable parts of two alternative contacts 146' and $146^2$ which are connected respectively to the fixed part of rest (lower part of the figure) and the fixed working part (upper part of the figure) of the contact 145.

The armature of the electromagnet 143 controls the movable parts of four alternate contacts 147' ... $147^4$ which are connected each to one of the four fixed parts (two parts of rest and two working parts) of the two alternating contacts $146^1$ and $146^2$.

Finally, the armature of the electromagnet 144 controls the movable parts of eight alternate contacts 148' ... $148^8$ which are connected, each to one of the eight fixed parts (4 of rest and 4 working parts) of the four alternate contacts 147' ... $147^4$.

According to the combination of the energized electromagnets, either the one or the other of the 16 fixed parts (8 of rest, lower, and 8 working parts, upper) of the 8 contacts 148' ... $148^8$ will be electrically connected to the jack $t$ through the contacts 145 ... 148. The figure shows 10 terminals numbered 0 to 9 and connected respectively to the ten parts of the contacts 148 corresponding to the values 0 to 9 according to the code.

The electromagnets 141, 142, 143 and 144 correspond respectively to the positions $a$, $b$, $c$, $d$ of the values 1, 2, 3 and 4 of the code i. e. when the data received by the selector comprises the position $a$ of value 1 of the code (i. e. is equal to 1, 5 or 8) the electromagnet 141 is energized; when this data comprises the position $b$ of value 2 of the code (i. e. is equal to 2, 6 or 9) the electromagnet 142 is energized; in the same manner for positions 3 and 4, the electromagnets 143 and 144 respectively will be energized.

The operation of the selector is as follows: If none of the 4 electromagnets is energized that data is zero according to the code; all the contacts remain in the position of rest (shown in Fig. 5) and $t$ is connected to the terminal $u_0$ in the following manner: jack $t$, movable part of 145, fixed part of rest of 145, movable part of $146^2$, fixed part of rest $146^2$, movable part of $147^4$, fixed part of rest of $147^4$, movable part $148^8$, fixed part of rest of $148^8$, terminal $u_0$.

If the electromagnets have received the data 1, the electromagnet 141 only is energized and the contact 145 only is in the working position, thereby connecting the jack $t$ to the terminal 1 in the following manner: jack $t$, movable part 145, fixed working part of 145, movable part of $146'$, fixed part of rest of $146'$, movable part of $147^2$, fixed part of rest of $147^2$, movable part of $148^4$, fixed part of rest of $148^4$, terminal $u_1$.

If the data received by the selector is 8, the electromagnets 141, 143 and 144 are energized and the contacts which they control or operate come into the working position, thereby connecting the jack $t$ to the terminal $u_8$ in the following manner: jack $t$, movable part of 145, fixed working part of 145, movable part of $146'$, fixed part of rest of $146'$, movable part of $147^2$, fixed working part of $147^2$, movable part of $148^3$, fixed working part of $148^3$, terminal $u_8$.

In the same manner for all the values 0, 1 . . . 9 received by the selector, the electromagnets immediately establish automatically the electric connection between the jack $t$ and the corresponding terminal $u_0$ $u_1$ . . . $u_9$. It may be stated that there cannot take place simultaneously a passage from the jack $t$ to more than one terminal $u$ and that several terminals $u$ cannot be connected simultaneously to the jack $t$.

The installation comprises in principle several selectors like that described. They are shown in Fig. 6 which corresponds exactly to Fig. 5 but minus all contacts which are not used when employing the decimal system for the data.

It is remarked that apparatuses such as totalizers and a printer may be added to this installation.

Principle of the installation

The installation in principle comprises the herein described apparatuses and is arranged for permitting their grouping (from an electrical point of view) to be varied at will so that these apparatuses can cooperate in different ways in order that the same installation, always comprising the same apparatuses, may serve various purposes, i. e. be used for performing different operations.

In principle, the present installation is adapted to produce perforated strips, i. e., transferring data by perforation to strips. The installation may also be used for compiling the data thus recorded on the strips either for totalizing the data, printing the data, printing their total, recording their total by perforation on a strip, etc.

In the present case, only the production of perforated strips will be dealt with.

As already stated in this specification, the installation may be used for transferring or recording data by perforation on a strip either by manual operation (i. e. by means of an operator operating a keyboard) or automatically (by means of another strip already perforated).

1st example of use

Using the installation for transfer (or recording) by perforation of data on a strip by means of the keyboard (Figs. 13, 13' and 14).

For this first example of use, the cooperation of the manually operable apparatus and the perforating apparatus is necessary. For this purpose, the following method is carried out:

As the various apparatuses are not connected at first by any electric conductor, one commences by connecting (by means of cables with 4 wires terminating at four-pole plugs adapted to cooperate with the four-pole jacks already mentioned) the jacks $G_1$, $G_2$ . . . $G_7$ (Fig. 13) of the manually operable apparatus to those of the jacks $B_1$, $B_2$ . . . $B_7$ (Fig. 4) of the perforating apparatus which corresponds to the rows $y_1$, $y_2$ . . . $y_7$ of punches 44 opposite those of the lines $x_1$, $x_2$ . . . $x_7$ of the plugs on which data must be recorded by perforation. The jacks $r$, $m$ and $q$ of the perforator (Fig. 4) are connected respectively to the jacks $k_1$, $k_2$, $k_3$ of the manually operable apparatus. The poles of the battery 163 are connected to the terminals 162 and 164 as shown in Fig. 13. The switches 118 and 119 are open but the switches 120 and 117 are closed. The arm 96 carrying brushes of the multiple switch E is in the position I. The keyboard D is now operated. The first key $m_5$ is depressed. It corresponds to the data 5. Owing to this depression, the electromagnets 121 and 124 of the row I of the relay G are energized by the following circuits: +pole 164, wire 149, contact 11 of the key $m_5$, wire 150, member 109, brush $109^2$ (Fig. 14), plug $109'$, of position I, wire 125 starting from this plug, electromagnet 121 of row I, wire 126, negative pole 162. The other circuit: +pole 164, wire 149, contact 14 of $m_5$, wire 153, member 112, brush $112^2$ (Fig. 14), plug 112' of position I, corresponding wire 125, electromagnet 124 of line I, wire 126, negative pole 162. The lamps 131 and 134 of the row I, which are branched in parallel relative to the electromagnets 121 and 124, are traversed by a current coming from the said wires 125 and re-uniting the wire 126 through the medium of the wire 136.

The excitation of the electromagnets 121 and 124 causes the latter to attract their armatures and to close their contacts 127 and 128. The closing of the contacts 127 causes current to the +pole to be brought directly to these two electromagnets by the wire 130, thereby allowing these electromagnets to remain energized notwithstanding the return of the key $m_5$ to the upper position and the breaking of the contacts which it controls. The closing of the contacts 128 of the electromagnets 121 and 124 had for its object to energize the corresponding electromagnets $51^a$ and $51^d$ of the line $y_1$ of the perforator (see Fig. 4) by the following circuits:

For the electromagnet $51^a$: +pole 164, wire 130, contact 128 of the electromagnet 121 of row I, wire 135 corresponding to this contact, corresponding wire of the cable connecting G' to B', electromagnet $51a$, wire 138, jack $r$, jack $k_1$, wire 126, negative pole 162.

For the electromagnet $51d$: +pole 164, wire 130, contact 128 of the electromagnet 124 of row I, wire 135 corresponding to this contact, corresponding wire of the cable connecting G' to B', electromagnet $51^d$, wire 138, jack $r$, jack $k'$, wire 126, negative pole 162.

The depression of the key $m_5$ has also produced, owing to the closing of the corresponding contact 15, the excitation of the relay 99 for operating the switch E (Fig. 15). The closing of this contact 15 has in fact completed the following circuit: +pole 164, wire 149 contact 15 of $m_5$, wire 154, 160, electromagnet 99, wire 161, negative pole 162. This excitation has for its object, as seen above, to cause the brush carrying arm 96' to make one eighth of a rotation clockwise for bringing it into the position II.

The following data is then struck by depressing, for example, the key $m_2$. In a similar manner to that described in detail, the depression of the key $m_2$—when the brush carrying arm of the switch E is in the position II—produces: the excitation of the electromagnet 122 of the row II of the relay switchboard G, the lighting of the lamp 132 of the row II, the excitation of the electromagnet $51b$ of the line $y_2$ of the perforating apparatus; and the advancement of the brush carrying arm one-eighth of a rotation clockwise for automatically bringing the said arm into the position III.

The data corresponding to the successively depressed keys produces successively the excitation of the relays 121 ... 124 of the line I, then of the line II, and of the line III etc. conformably to the said data. If, for example $m_5$ $m_2$ $m_7$ $m_1$ are depressed successively, the rows I II III and IV of electromagnets of the switchboard G will receive respectively in the form of current the data 5, 2, 7 and 1. The depression of $m_0$ does not produce the excitation of any electromagnet but causes the rotation of the brush carrying arm owing to the closing of the corresponding contact 15.

When the data has been sent to each row of electromagnets of the board G, the switch has reached the position VIII. The striking is then verified by examining the lamp switchboard F. The operator, who knows the code perfectly, sees immediately whether one or several rows of lamps are not lighted according to the desired striking. If for example, he has struck $m_5$ instead of $m_6$ for the line IV, he will see immediately that they are the lamps 131 and 134 of the row IV which are lighted instead of 132 and 134.

When the operator does not find an error, he starts the operation of the perforating apparatus in the manner described later.

If, on the contrary, he finds an error in one or several lines, he proceeds as follows:

1. Momentary opening of switch 120 corresponding to this row which causes the breaking of the circuit of the electromagnet 121 ... 124 of the row in question (as well as those of the corresponding line of the perforating apparatus);

2. Closing this switch 120;

3. Rotating the arm 96 of the multiple switch E by means of the handle 98 counter-clockwise until this arm is in the position corresponding to the row of the electromagnet brought to rest by means of the switch 120;

4. Depressing the key of the keyboard corresponding to the exact data;

5. Rotating the arm 96 of the switch E by means of the handle 98 counter-clockwise until this arm has returned to position VIII;

6. Starting the operation of the perforating apparatus.

This operation is started merely by depressing any key of the keyboard D, for example, $m_0$ so as to close one of the contacts 15. The closing of one of these contacts has the following result: Excitation of the engaging electromagnet 22 (Fig. 4) of the perforating apparatus by closing the following circuit: +pole 164, wire 149, contact 15 closed, wire 154, 157, wire 158, plug 115, brush $112^2$ (Fig. 14), plug 116, wire 159, jack $k_2$, jack $m$, wire 138, jack $r$, jack $k_1$, wire 126, negative pole 162; excitation of the electromagnet $129b$ for the strip feeding mechanism of the perforating apparatus by means of the current coming from the wire 159 and passing to the jack $k_3$, jack $q$, electromagnet $129b$, wire 138, jack $r$, jack $k_1$, wire 126, negative pole 162; and excitation of the controlling electromagnet 99 of the switch E by the circuit: +pole 164, wire 149, contact 15 closed, wire 154, 160, electromagnet 99, wire 161, negative pole 162.

The excitation of the engaging electromagnet 22 has for its object, as has been stated previously, to depress the yoke 45 of the perforating apparatus (Fig. 9) and to perforate the strip $i$ by means of punches which have been locked owing to the excitation of the corresponding electromagnet 51.

The excitation of the electromagnet 129$b$ for the strip feeding mechanism of the perforating apparatus has for its object, as has already been seen, to feed the said strip to the extent of the width of a card i. e. to bring the following card opposite to the punches.

The excitation of the electromagnet 99 of the switch E causes the rotation of the brush carrying arm 96 for making it pass from position VIII to position I. This rotation has for its object to break the electric connection between the contacts 115 and 116 whereby the engaging electromagnet 22 and the electromagnet 129$b$ of the strip feeding mechanism are prevented from being energized during more than one revolution of the shaft 18 of the perforating apparatus, thereby resulting in perforating the same data on several consecutive cards.

Now the operator momentarily opens the switch 117 (Fig. 13) thereby breaking the common return wire of the auxiliary circuit previously indicated (wires 168, 169, 137, contacts 127, wires 136 and 126) of the relays of the switchboard G. These relays therefore return to rest whereby owing to the breaking of the contacts 128 the electromagnets 51 of the perforating apparatus are de-energized. All the punches therefore return to normal position.

It happens frequently that when data is transferred to a series of cards of a strip, some of these data are invariable for a series of cards or even for all the cards (this is for example a date, an order number, etc.). One has therefore to transfer a group of data to each card. Some of these data vary (in value) from one card to the other while some may remain constant at least for a certain number of successive cards.

In this case, one proceeds in the following manner:

II IV and V are the rows of relays corresponding to the lines of the cards adapted to receive constant data and the lines I III VI and VII are the rows corresponding to the lines of the cards adapted to receive variable data.

In order to initiate operations, the operator operates the keyboard so as to send to the relays of the lines I . . . VII the data corresponding to the first card which he must perforate in the manner indicated above. Before opening the switch 117 for bringing back to rest the relays 121 . . . 124 of the lines I . . . VII, he closes the switches 118, 119 of the rows II, IV, V corresponding to the lines with constant data. He then opens the said switch 117.

The closing of the switch 119 has for its object to allow the previously energized electromagnets (owing to the striking of the keyboard) of the rows II, IV, V to remain energized notwithstanding the opening of the switch 117 and because of the fact that for these electromagnets the auxiliary circuit is closed in the following manner: +pole 164, wire 168, 167, wire 166, switches 119 closed, corresponding wires 137, closed contacts 127 of the rows II, IV and V, corresponding electromagnets 121 . . . 124, wire 126, negative pole 162.

The electromagnets of the rows I, III, VI and VII of the switchboard G return to rest owing to the momentary opening of the switch 117. It follows therefore that the electromagnets 51 of the perforating apparatus L corresponding to the lines with constant data remain energized while those corresponding to the lines with variable data are deenergized.

The operator now commences the operation for the following card which is as follows: He strikes the key of the keyboard corresponding to the data adapted for the row I thereby energizing the corresponding relays of this row of the switchboard G and bringing the brush carrying arm 96 of the multiple switch E into the position II. On its arrival in this position, its brush 113$^2$ completes the following circuit thereby energizing the electromagnet 99 and automatically causing the passage of the said arm into the position III: +pole 164, wire 149, wire 155, 156, member 113, brush 113$^2$ (Fig. 14), contact 113 of position II, corresponding wire 165, switch 118 of line II, wire 154, 160 electromagnet 99, wire 161, negative pole 162.

The passage of the switch E from the position I to the position III is practically instantaneous so that the operator has only to strike the keys of the keyboard successively in conformity with the data he desires to send to the rows I and III in order that when he strikes the second data, the switch automatically reaches the position III. The striking of the key corresponding to the second data (for the line III) produces, owing to the closing of the corresponding contact 15, the excitation of the electromagnet 99 and brings the switch into the position IV. As soon as this position is reached, the circuit of the electromagnet 99 is again closed by the circuit: 164, 149, 155, 156, 113, 113$^2$ (Fig. 14), 113$'$ of position IV, corresponding wire 165, 118 of row IV, 154, 160, 99, 161, 162. The switch therefore passes immediately into the position V in which the circuit of the electromagnet 99 is again closed in a similar manner owing to the closed position of the switch 118 of line V; the switch therefore passes automatically and almost instantaneously into the position VI. In this manner, when the operator depresses a key for the third time, the corresponding data is sent to the row VI of the switchboard G since the switch has already reached the position VI. Finally in consequence of the following striking operations the switch reaches the position VII and the position VIII whereupon the operator verifies the striking by means of the switchboard H. He corrects the inexact data and starts the perforation in the manner indicated above.

He now opens the switch 117 momentarily and resumes the same operations for the following card.

In this manner, the first striking of a data is used for effecting its automatic repetition on the successive cards when this data is repeated.

If it happens that the data of the lines II, IV or V must be varied, it is sufficient to open the corresponding switches 118, 119; if, on the contrary, such data must be repeated identically at a given moment on the same line for several consecutive cards, it is sufficient to close the switches 118, 119 corresponding to these lines so that the operator need not strike them several times.

It will be noticed that the feed of the brush carrying arm 96 of the switch E for the positions corresponding to the constant data is effected in a sufficiently rapid manner so that there is no reason to fear that a data may be struck on the keyboard before the switch has reached the desired position.

2nd example.—Automatic operation of the installation (a) Using the installation for the automatic transfer or recording of data on a copy strip from an original strip.

1st application (Fig. 16)

An original strip is formed with cards of 7 lines $X_1 \ldots X_7$. It is desired to obtain a copy strip formed of cards each corresponding to one of the cards of the original strip which have on the line $x_6$ a data whose value is equal to 3 or to 8, and which contain only the data recorded on the lines $x_4$ and $x_5$ of the corresponding card of the original strip.

It is therefore a question of transferring by perforation to the cards of a copy strip the data recorded on the lines $x_4$ and $x_5$ of the cards of the original strip which comply with the condition (data of $x_6$ equal to 3 or to 8).

In order to carry out this program of work, the installation is arranged in the following manner:

The jacks $A_4$ and $B_4$ on the one hand and $A_5$ and $B_5$ on the other hand are connected in pairs by a cable 170, 171 comprising 4 wires and terminating at two plugs with quadruple contact. In this manner, each of the contact members 84a, 84b, 84c, 84d of the lines $x_4$ and $x_5$ is connected to one of the terminals of the electromagnets 51a, 51b, 51c, 51d of the lines $y_4$ and $y_5$ of the perforating apparatus L.

The jack $A_6$ is connected to the jack C of a selector S by a cable 172 with 4 conductors so that the 4 contact members 84a ... 84d of the line $x_6$ are connected to one of the terminals of the electromagnets 141, 142, 143, 144 of the selector.

The jack n of the reading apparatus is connected to the +pole of the battery 173 by a conductor 174. The jack p is connected to the negative pole of this battery by a conductor 175.

There is also connected to the +pole of the said battery the jack q by a conductor 176. To the negative pole is connected a conductor 177 connecting the jack t of the selector to this pole. A conductor 178 leads from the jack s and terminates at the point 179 of the conductor 177. A conductor 180 divided into two branches 181, 182 connects the terminals $u_3$ and $u_8$ of the selector to the jack r of the perforating apparatus.

The lever 21 (Figs. 9 and 10) is brought into the position (indicated by dotted lines in Fig. 10) for which the cam 19 is in operative position.

As seen above, the terminals $u_3$ and $u_8$ of the selector are connected electrically to the jack t by the contacts of the electromagnets 141 ... 144 when the data is received at C (i. e. the data read at $x_6$ is equal to 3 and 8 respectively).

The operation of the installation thus arranged is as follows:

The original strip is arranged in the reading apparatus K and the copy strip in the perforating apparatus L and the two apparatuses are started, i. e. their shaft (18 or 18' Figs. 7 and 12) engages in a suitable manner with the shaft of a motor not shown.

During the first rotation of the shaft 18, 18' of these two apparatuses:

The contact members 84 of the lines $x_1 \ldots x_7$ are lowered on the first card of the original strip. The contact members of the line $x_6$ which comes in contact with the plate 79 (i. e. those of the said members which pass through a perforation of the line $x_6$ of the first card of the original strip) complete the circuit of the corresponding electromagnets of the selector S: +pole, wire 174, wire 89, plate 79, contact members 84 of the line $x_6$, corresponding wires of the cable 172, corresponding electromagnets of the selector S, jack s, wire 178, point 179, wire 177, negative pole of the battery 173. The data recorded on the line $x_6$ is therefore read through the contact members 84 of the line $x_6$ and is transmitted to the selector. If it is not equal to 3 or to 8, the terminals $u_3$ and $u_8$ are not connected to the jack $t$. It follows that the electromagnets $51a \ldots 51d$ of the perforating apparatus are no longer able to be energized; neither is the electromagnet $129b$ of the strip feeding mechanism. Under these conditions, no perforation can be made on the copy strip during the first rotation. The yoke 45 (Fig. 9) is lowered (see description of the perforating apparatus) but all the punches remain in the upper position.

The electromagnet $129a$ of the feeding mechanism of the reading apparatus is continually energized so that during rotation of the shaft it advances the original strip by one card.

If, on the contrary, the data read at $x_6$ is equal to 3 or to 8, the following result takes place:

The terminal $u_3$ or $u_8$, according to the value read at $x_6$, is connected to $t$ and the data read at $x_4$ and $x_5$ are transmitted to the electromagnets of the lines $y_4$ and $y_5$ through the following circuits: +pole, wire 174, jack $n$, wire 89, plate 79, contact members 84 of lines $x_4$ and $x_5$, jacks $A_4$ and $A_5$, cables 170 and 171, jacks $B_4$ and $B_5$, electromagnets of the lines $y_4$ and $y_5$, wire 138, jack $r$, wire 180, wire 181 or 182, terminal $u_3$ or $u_8$, contacts controlled by the electromagnets of the selector, jack $t$, wire 177, negative pole.

The yoke of the apparatus is lowered and entrains the locked punches owing to the excitation of the electromagnets which have received current through the medium of those of the contact members of the lines $x_4$ and $x_5$ which have encountered the plate 79 while passing through perforations of the card.

The perforations read at $x_4$ and $x_5$ are therefore identically reproduced on the copy strip at $y_4$ and $y_5$.

The two strips then advance by one card; the original strip for the reason previously stated and the copy strip because the circuit of the electromagnet $129b$ is completed through the selector: +pole, wire 176, jack $q$, $129b$, point $w$, jack $r$, wire 180, wire 181 or 182, terminal $u_3$ or $u_8$, controlled contacts of the selector, jack $t$, wire 178, negative pole.

During the following rotation of the driving shaft, the same occurs with regard to the second card of the original strip and also in succession for all the following cards. It will be noticed that as the feed of the copy strip is determined through the medium of the selector by the reading at $x_6$ there are no non-perforated cards in the copy strip as would be the case if the copy strip advanced one card during each rotation of the driving shaft.

In order to facilitate the reading of the diagram, in Fig. 16 (also in Figs. 17, 17' and 18) the direction of the current has been indicated by arrows, assuming that it circulates from the +pole to the −pole of the battery to the exterior thereof.

*2nd application (Figs. 17 and 17')*

In Figs. 17 and 17' is shown a perforated original strip and an unperforated strip (which must constitute a copy strip). It is a question on the one hand of transferring to each card of this copy strip the data recorded by perforation on the two lines $x_2$ and $x_3$ of one of the cards of the original strips; consequently, a card of the copy strip corresponds to each card of the original strip. It is a question on the other hand of perforating on the line $y_4$ cards of the copy strip:

The hole representing the position "1" when the data at $x_6$ on the original strip is equal to 2, 6 or 7;

The hole representing the position "2" when the data at $x6$ on the original strip is equal to 1, 6 or 8;

The hole representing the position "3" when that data at $x6$ on the original strip is equal to 3 or 6;

The hole representing the position "4" when the data at $x6$ on the original strip is equal to 0, 1 or 7.

In order to carry out this program automatically, the reading apparatus K, the perforating apparatus L and 4 selectors $S_1$, $S_2$, $S_3$, $S_4$ are made to collaborate after having connected them in the following manner, shown in Figs. 17 and 17'.

The jacks $A_2$ and $B_2$ on the one hand and $A_3$ and $B_3$ on the other hand are respectively united in pairs by cables 183 and 184, each with 4 conductors.

The jacks $C_1$, $C_2$, $C_3$, $C_4$ of the selectors are connected in parallel to a bundle 185 of 4 conductors by means of cables 186, 187, 188, 189. The bundle 185 has its 4 wires connected respectively to the 4 poles of the jack $A_6$ through the medium of the cable 190. The cable 191 is connected at one of its ends to the jack $B_4$. Its 4 wires 192, 193, 194, 195 are therefore connected respectively to the electromagnets $51a$, $51b$, $51c$, $51d$ of the row $y_4$ which correspond to the positions "1", "2", "3", and "4" of the line $y_4$.

The wire 192 is connected to the terminals $u_2$, $u_6$ and $u_7$ of the selector $S_1$; 193 is connected to the terminals $u_1$, $u_6$ and $u_8$ of the selector $S_2$; 194 is connected to the terminals $u_3$ and $u_6$ of the selector $S_3$; finally 195 is connected to the terminals $u_0$, $u_1$ and $u_7$ of the selector $S_4$.

The jacks $t$ of the 4 selectors are connected by 4 conductors 197 to a conductor 196 connected to the +pole of the battery 173. This +pole is also connected to the jack $n$ by a wire 198 and to the jack $q$ by a conductor 199. The jack $r$ is connected to the negative pole of the battery by a conductor 200 to which are connected the 4 conductors 201 leading respectively from the 4 jacks S.

The operation of the installation thus arranged is as follows:

The controlling or operating lever 21 (Fig. 9) is brought into the position for which the cam 19 is in operative position. The original strip is in the reading apparatus and the unperforated or copy strip is placed in the perforating apparatus. The apparatuses are started i. e. engaged on the driving shaft (not shown) of the installation. During the first rotation of the shaft 18 or 18' of the apparatus (Figs. 9 and 12) the following takes place:

The contact members 84 of the lines $x_1 \ldots x_7$ are lowered. The contact members of the lines $x_2$ and $x_3$ transmit the data read at $x_2$ and $x_3$ to the electromagnets 51 of the lines $y_2$ and $y_3$. The data read at $x_6$ is sent to the 4 selectors through the medium of 190, 185, 186, 187, 188, 189.

If the data read at $x_6$ is equal to 2, 6 or 7, the following circuit of the electromagnet $51a$ of line $y_4$ is completed by the controlled contacts of the selector $S_1$: +pole, wire 196, jack $t$, contacts of the selector $S_1$, terminal $u_2$, $u_6$ or $u_7$, wire 192, electromagnet $51a$ of line $y_4$, wire 138, jack $r$, wire 200, negative pole.

In a similar manner:

The electromagnet $51b$ of line $y_4$ will be energized if the data read at $x_6$ is equal to 1, 6 or 8, because in this case the selector $S_2$ completes the circuit of this electromagnet; the circuit of the electromagnet $51c$ of line $y_4$ is completed by the selector $S_3$ if the value of the data read at $x_6$ is equal to 3 or 6; while the selector $S_4$ completes the circuit of the electromagnet $51d$ if the data read at $x_6$ is equal to 0, 1 or 7.

The cam 19 produces, as already stated, the lowering of the yoke, and the punches locked owing to the excitation of the corresponding electromagnets 51 produce the perforation of the first card of the copy strip. The yoke and the punches are then raised again, and the contact members of the reading apparatus are also raised again thereby breaking the circuit of all the previously energized electromagnets 51. Towards the end of the first rotation (the electromagnets $129a$ and $129b$ being continuously energized) the two strips advance one card and during the following rotation the operations are repeated in a similar manner relative to the two new cards brought opposite the contact members and the punches.

(b) *Using the installation for the automatic search in a strip for a card having certain characteristics (Fig. 18)*

3rd application.—Searching, for example, in a strip for a card having all of the following characteristics:

A data equal to 1 recorded by perforation on the line $x_7$;
A data equal to 8 recorded by perforation on the line $x_4$;
A data equal to 5 recorded by perforation on line $x_3$.

For this purpose, one needs only the reading apparatus A, three selectors $S_1$, $S_2$ and $S_3$, a relay 201 and an electric alarm 202 adapted to signal automatically when the card sought for has been found.

The connections are arranged in the following manner as indicated in Fig. 18:

The jacks $A_3$, $A_4$, $A_7$ are connected respectively to the jacks $C_1$, $C_2$, $C_3$ of the selectors by cables 203, 204, 205 with 4 conductors. The jacks $s$ of the selectors are connected, each by a wire 206 to a conductor 207 terminating at the negative pole of the battery 173.

The jack $t$ of $S_3$ is connected to the +pole by a conductor 208. The terminal $u_1$ of $S_3$ is connected to the jack $t$ of $S_2$ by a wire 209; the terminal $u_8$ of $S_2$ is connected to the jack $t$ of $S_1$ by a wire 210; the terminal $u_5$ of $S_1$ is connected by a wire 211 to one of the terminals of the relay 201, the other terminal being connected to the wire 207 by a conductor 212.

One of the terminals of the alarm (which may be an acoustic or optical signalling device with electric control of any type) is connected by one of its terminals to the conductor 211 through the medium of a wire 213 and by its other terminal or conductor 207 through the medium of a wire 214.

The relay 201 controls a contact 215, which is normally closed, so as to break it as current passes through the winding of the relay. It also controls a second contact 220, normally opened, and adapted to be closed when the relay is energized.

The jack $p$ is connected to the movable part of the contact 215 by a conductor 218 while the fixed part of the contact 217 of this contact is connected to the conductor 212. The fixed part 221 of contact 220 is connected to the wire 211 at 224 while the movable part 222 is connected to the +pole of the battery by a conductor 223. The jack $n$ is connected to the +pole of the battery by a wire 219.

The operation of the installation thus arranged is as follows:

The strip is arranged in the reading apparatus, the first card opposite the contact members 84; the reading apparatus is started.

During the first rotation of the driving shaft 18' (Fig. 12) the contact members 84 are lowered and "read" the data recorded by perforation on the first card. The data read at $x_3$ is sent to $S_1$ through the cable 203; that read at $x_4$ is sent to $S_2$ through the cable 204; that read at $x_7$ is sent to $S_3$ through the cable 205.

In order that the terminal $u_5$ of $S_1$ may be electrically connected to the jack $t$ of $S_3$ through the contacts controlled by the selectors, the following steps must take place simultaneously: $S_1$ receives a data equal to 5 so that its jack $t$ is connected to its terminal $u_5$; $S_2$ receives a data equal to 8 so that its jack is connected to its terminal $u_8$; $S_3$ receives a data equal to 1 so that its jack $t$ is connected to its terminal $u_1$.

If these three selectors do not receive during the first rotation of the shaft the three characteristic data, the relay 201 and the device 202 cannot be energized. Towards the end of the rotation, the contact members are again raised thereby breaking the circuit of the electromagnets of the selectors. The electromagnet 129a, which is energized by the following circuit: +pole, 219, $n$, 129a, $p$, 218, 215, 212, 207, —pole, produces the feed of the strip by one card.

During the second rotation of the shaft, the same operations are repeated but with regard to the following card and in succession. When one encounters a card which satisfies the fixed triple condition the three selectors complete the exciting circuit of the relay 201 and the device 202. The exciting circuit of the relay 201 is: +pole, 208, $t$, $S_3$, $u_1$, 209, $t$, $S_2$, $u_8$, 210, $t$, $S_1$, $u_5$, 211, 224, 201, 212, 207, negative pole. The electromagnet 201 therefore breaks the contact 215 and closes the contact 220. The result thereof is that after the raising of the contact members 84 the electromagnet 201 will continue to be energized through the following circuit: +pole, 223, 220, 224, 201, 212, 207, negative pole. The breaking of the contact 215 results in the electromagnet 129b being no longer energized while 201 remains energized which leads to the result that the strip remains immovable until the operator intervenes. This latter is advised by the fact that the card sought for is found by the device 202 which has been energized at the same time as 201 but through the following circuit: +pole, 208, $t$, of $S_3$, $S_3$, $u_1$, 209, $t$, $S_2$, $u_8$, 210, $t$, $S_1$, $u_5$, 211, 213, 202, 214, 207, negative pole. This device like the relay 201 continues to be energized after the raising of the contact members and the de-excitation of the electromagnets of the selectors; and this action is accomplished through the following circuit which the closing of the contact 220 has completed; +pole, 223, 220, 224, 211, 213, 202, 214, 207, negative pole.

The alarm 202 therefore continues to act until the operator intervenes.

It has been merely by way of exemplification of the invention, and it is to be understood that the invention is susceptible to numerous modifications and exemplifications without departing from the spirit of the invention. Accordingly, it is intended that the application be limited only by the scope of the appended claims.

I claim:

1. Installation for perforating on cards or sections of a strip data taken from a control strip having perforated data thereon, comprising in combination an automatic perforating apparatus comprising punch setting electromagnets; punches controlled by the said electromagnets; and adapted to produce perforations representing data in the said strip; an automatic apparatus for transmitting data from a perforated control strip to said electromagnets, the transmitting apparatus comprising a plurality of contacts for periodically closing through the perforations of the control strip for effecting the transmission in the form of currents of data from the control strip; means for producing step by step movement of the strips in the said apparatus, whereby various sections of the strips are brought successively into perforating position opposite the punches, and into reading position opposite the contacts, respectively; a manually operable data transmitting apparatus comprising a plurality of control members each corresponding to a particular digit; sets of contacts, switches, and sets of relays controlled by the said control members and adapted to transmit the data in the form of electric currents corresponding to the control member which has been manually operated; connecting means for connecting prior to the start of operations and at the will of the operator selected ones of the punch setting means of the perforating apparatus to one or both of the transmitting apparatus according to the nature of the transfer to be effected; a selecting apparatus connectible at will with the perforating apparatus and the automatic transmitting apparatus, comprising a plurality of electromagnets for receiving the data transmitted from the automatic transmitting apparatus, and a plurality of contacts controlled by the said electromagnets and arranged in such manner that for each datum received by the electromagnets, certain of the contacts are closed while selected other magnets are opened, and controlling automatically the transmission or preventing the transmission of all or part of the data obtained from the automatic transmitting apparatus according to the value of at least one datum on the control card.

2. Apparatus according to claim 1, embodying means for connecting at will the contacts of at least one selecting apparatus to the electric control device for feeding the strip in the automatic perforating apparatus, so that the feed of said strip is automatically controlled by the selecting apparatus according to the value of at least one datum received from the automatic transmitting apparatus, said selecting apparatus effecting the feed of the said strip when the data of the card in the reading position present desired characteristics, and automatically preventing the feed of the said strip when the data of the card in reading position do not present the desired characteristics required for effecting a transfer to the strip in the perforating apparatus, whereby to avoid the occurrence of unperforated cards in the strip of the perforating apparatus.

3. Installation for perforating on cards of a strip data taken from a control strip having perforated data thereon, comprising in combination an automatic perforating apparatus comprising a plurality of sets of punch setting electromagnets, punches controlled by the said electromagnets and adapted to produce perforations representing data in the said strips; an automatic apparatus for transmitting data from a perforated control strip to said electromagnets, the transmitting apparatus comprising a plurality of contacts for periodically closing through the perforations of the control strip for effecting the transmission in the form of electric currents of data from the control strip; an electric device for producing step by step movement of the strips in the said apparatus, whereby various cards of the strips are brought successively into perforating position opposite the punches, and into reading position opposite the contacts respectively; selecting apparatus in combination with the automatic perforating apparatus and the automatic transmitting apparatus comprising a plurality of electromagnets for receiving the electrically transmitted data from the automatic transmitting apparatus; and a plurality of contacts controlled by the said electromagnets in such manner that for each datum received by the electromagnets, certain of the contacts are closed and selected other contacts are opened; connecting members for establishing connections between the automatic transmitting apparatus and the automatic perforating apparatus directly or through one or more selecting apparatus in such manner as required by the desired transfer, controlling automatically the transmission or preventing such transmission of all or part of the data obtained from the automatic transmitting apparatus according to the value of at least one datum on the control card.

4. Installation for perforating data to cards of a strip partly automatically from a control strip and partly by manual operation, comprising in combination an automatic perforating apparatus, an automatic data transmitting apparatus and a manually operated data transmitting apparatus, the said manually operated transmitting apparatus comprising a plurality of control members each corresponding to a particular digit, sets of contacts, switches and sets of electro-magnets controlled by the said control members, and adapted to transmit data in the form of electric currents corresponding to the control member which has been manually operated; and connecting means for connecting prior to the start of the operations selected contacts of the automatic transmitting apparatus as well as selected electromagnets of the manually operated transmitting apparatus to selected electromagnets of the automatic perforating apparatus in such manner that part of the data of a card of the control strip is automatically reproduced on a card of the strip in the perforating apparatus, and that other data is perforated on the same card by means of the manually operated transmitting apparatus.

5. Installation for perforating on cards or sections of a strip data taken from a pattern strip, comprising perforating apparatus including punch setting means and punches controlled thereby, means for sensing the perforations in the pattern strip and setting up the punches accordingly, means for imparting an intermittent movement to said strips, a second data transmitting apparatus comprising a plurality of control members each corresponding to a particular digit and adapted to set up the punches accordingly, and connecting means for connecting prior to the start of operations, and at the will of the operator selected ones of the punch setting means of the perforating apparatus to one or both of the transmitting apparatus according to the nature of the transfer to be effected.

6. Installation for perforating on cards or sections of a strip data taken from a pattern strip, comprising perforating apparatus including punch setting means and punches controlled thereby, means for sensing the perforations in the pattern strip and setting up the punches accordingly, means for imparting an intermittent movement to said strips, a second data transmitting apparatus comprising a plurality of control members each corresponding to a particular digit and adapted to set up the punches accordingly, connecting means for connecting prior to the start of operations, and at the will of the operator selected ones of the punch setting means of the perforating apparatus to one or both of the transmitting apparatus according to the nature of the transfer to be effected, and a selecting apparatus connectible at will with the perforating apparatus and the first-mentioned transmitting apparatus for controlling automatically the transmission of or preventing the transmission of all or part of the data obtained from the pattern strip as desired.

7. Installation for perforating on cards or sections of a strip data taken from a pattern strip, comprising perforating apparatus including punch setting electromagnets and punches controlled thereby, means for sensing the perforations in the pattern strip and setting up the punches accordingly, means for imparting an intermittent movement to said strips, a second data transmitting apparatus comprising a plurality of control members each corresponding to a particular digit and adapted to set up the punches accordingly, and electric connecting means for connecting prior to the start of operations and at the will of the operator selected ones of the electromagnets of the perforating apparatus to selected contacts of one or both of the transmitting apparatus according to the nature of the transfer to be effected.

8. Installation for perforating on cards or sections of a strip data taken from a pattern strip, comprising perforating apparatus including punch setting means and punches controlled thereby, means for sensing the perforations in the pattern strip and setting up the punches accordingly, means for imparting an intermittent movement to said strips, a second data transmitting apparatus comprising a plurality of control members each corresponding to a particular digit and adapted to set up the punches accordingly, and connecting means for connecting prior to the start of operations, and at the will of the operator selected ones of the punch setting means of the perforating apparatus to one or both of the transmitting apparatus according to the nature of the transfer to be effected, said control members comprising manually operable means for punching desired data on the derived strip simultaneously with the automatic perforation thereon of desired data from the pattern strip.

9. In an installation for perforating cards or sections of a strip and comprising a punching mechanism and a plurality of means for setting up the data to be punched, a manually operable keyboard for causing the selective energization of the said data setting means according to a code, and a multiple switch for transferring the data sent by code from the keyboard to a particular one of the data setting means, according to the momentary position of the switch.

10. In an installation for perforating cards or sections of a strip, and comprising a punching mechanism and a plurality of means for setting up the data to be punched, a manually operable keyboard for causing the selective energization of the said data setting means according to a code, and a multiple switch operable at will either automatically step by step or manually to any desired position, for transferring the data sent by code from the keyboard to a particular one of the data setting means, according to the momentary position of the switch.

11. In an installation for perforating cards or sections of a strip, and comprising a punching mechanism, a plurality of means for setting up and retaining the data to be punched, a manually operable keyboard for causing the selective energization of the said data setting means according to a code, and a multiple switch for transferring the data sent by code from the keyboard to a particular one of the data setting means, according to the momentary position of the switch.

12. In an installation for perforating cards or sections of a strip, and comprising a punching mechanism, a plurality of means for setting up and retaining the data to be punched, a manually operable keyboard for causing the selective energization of the said data setting means according to a code, and a multiple switch operable at will either automatically step by step or manually to any desired position, for transferring the data sent by code from the keyboard to a particular one of the data setting means, according to the momentary position of the switch.

13. In an installation for perforating cards or sections of a strip, and comprising a punching mechanism, a plurality of sets of electromagnets for setting up and retaining the data to be punched, a manually operable keyboard for causing the selective energization of the said sets of electromagnets, and a multiple switch for transferring the data sent by code from the keyboard to a particular one of the sets of electromagnets, according to the momentary position of the switch.

14. In an installation for perforating cards or sections of a strip, and comprising a punching mechanism, a plurality of sets of electromagnets for setting up and retaining the data to be punched, a manually operable keyboard for causing the selective energization of the said sets of electromagnets, a multiple switch for transferring the data sent by code from the keyboard to a particular one of the sets of electromagnets, according to the momentary position of the switch, and means cooperating with the said sets of electromagnets for indicating the values set up therein.

15. In an installation for perforating cards or sections of a strip, and comprising a punching mechanism, a plurality of means for setting up and retaining the data to be punched, a manually operable keyboard for causing the selective energization of the said data setting means according to a code, a multiple switch for transferring the data sent by code from the keyboard to a particular one of the data setting means, according to the momentary position of the switch, and means cooperating with the said data setting means for indicating the values set up therein.

16. In an installation for perforating cards or sections of a strip, and comprising a punching mechanism, a plurality of means for setting up and retaining the data to be punched, a manually operable keyboard for causing the selective energization of the said data setting means according to a code, a multiple switch for transferring the data sent by code from the keyboard to a particular one of the data setting means, according to the momentary position of the switch, and a plurality of means cooperating one with each of the said data setting means for indicating the values set up therein.

17. In an installation for perforating cards or sections of a strip, and comprising a punching mechanism, a plurality of means for setting up and retaining the data to be punched, a manually operable keyboard for causing the selective energization of the said data setting means, a multiple switch for transferring the data sent from the keyboard to a particular one of the data setting means, according to the momentary position of the switch, a plurality of means cooperating one with each of the said data setting means for indicating the values set up therein, and a correcting means for clearing at will any data setting means, should an incorrect value be set up therein, as indicated on the said indicating means.

18. In an installation for perforating cards or sections of a strip, and comprising a punching mechanism, a plurality of means for setting up and retaining the data to be punched, a manually operable keyboard for causing the selective energization of the said data setting means, a multiple switch for transferring the data sent from the keyboard to a particular one of the data setting means, according to the momentary position of the switch, a plurality of means cooperating one with each of the said data setting means for indicating the values set up therein, and a plurality of correcting means cooperating one with each of the said data setting means for clearing at will a corresponding data setting means, in which a value has previously been set up.

19. In an installation for perforating cards or sections of a strip and comprising a punching mechanism, a plurality of data retaining means for retaining the data to be punched, a keyboard for causing the selective energization of the said data retaining means, a multiple switch for transferring the data sent from the keyboard to a particular one of the data retaining means according to the momentary position of the switch, and for transferring the data from said data retaining means after the desired ones of the complete set of data retaining means have been energized to said punching mechanism, and for normally clearing all of the data retaining means, and additional means for causing the retention in any desired data retaining means of the value previously set up therein after such value has been transferred.

20. An installation for perforating cards or sections of a strip, comprising a punching mechanism, a plurality of data retaining sets of electromagnets for actuating the punches and energized by data transferred thereto, a plurality of means for retaining the data to be punched, a keyboard for causing the selective energization of the said data retaining means, a multiple switch for transferring the data sent from the keyboard to a particular one of the data retaining means according to the momentary position of the switch, and for transferring the data from said data retaining means to the set of electromagnets after the desired ones of the complete set of data retaining means have been energized to said punching mechanism, for normally clearing all of the data retaining means, and for releasing the punches so that they can be tripped under the actuation of the corresponding electromagnets.

21. Apparatus according to claim 1 embodying means for connecting at the will of the operator the controlled contacts of selected ones of the selectors to the electric control means for normally effecting the feed of the strip in the automatic transmitting apparatus, and for automatically stopping the operation or function of the said means, for immobilizing the strip when a card presenting predetermined data reaches the reading position.

22. Apparatus according to claim 1, wherein the mechanism for feeding the strips in the perforating and transmitting apparatus comprises an electrically controlled intermediate member, a driving member adapted to rotate regularly, and a member effecting the said feeding of the strip of the corresponding perforating or transmitting apparatus, the said intermediate member being adapted to effect the momentary connection between the said driving member and the said feed-effecting member, the said feed-effecting member effecting the feed of the corresponding apparatus to an extent equal to the width of the card when the said intermediate member establishes the said connection with the driving member.

23. Apparatus according to claim 1 wherein the mechanism for feeding the strip in the perforating and automatic transmitting apparatuses comprises a rotating member entraining the strip, a Maltese cross having slides to which the rotating member is connected, a driving shaft adapted to rotate regularly, an intermediate member on the said shaft and adapted to always rotate therewith and also adapted for axial movement therealong between two extreme positions, in one of which said positions the said intermediate member cooperates with the said cross for entraining it, while in the other of the said external positions the intermediate member is disengaged with the cross whereby the latter remains in movement, means for continually urging the intermediate member to occupy a selected one of the two external positions, and an electromagnet for bringing the intermediate member into the other external position.

24. Apparatus according to claim 1, wherein the manually operable transmitting apparatus for transferring original datum to a strip arranged in the perforating apparatus comprises a keyboard having a plurality of keys, each of which corresponds to a particular data, a plurality of groups of relays arranged for temporarily and sequentially recording data according to the depression of the said keys, contacts for the said relays controlled by the said keys, electrically controlled optical means for verifying the readings of the depressed keys before transmission to the perforating apparatus occurs, means for correcting the data recorded by selected ones of the group of relays at the will of the operator before perforation, and means for effecting at will, after verification and eventual correction, the simultaneous transmission to the perforating apparatus of all of the data recorded by the groups of relays.

25. Apparatus according to claim 1, wherein the manually operable transmitting apparatus for transferring of original data to a strip arranged in the perforating apparatus comprises a keyboard having a plurality of keys each corresponding to a particular datum, a plurality of groups of relays arranged for temporarily recording in sequence the data according to the depression of the keys, contacts for the said relays adapted to be controlled by the said keys, electrically controlled optical means for verifying, before the transmission to the perforating apparatus, the data according to the depressed keys, means for correcting at will before perforation the data recorded by selected ones of the groups of relays, means for effecting at will after verification and eventual correction the simultaneous transmission to the perforating apparatus of all the data recorded by the groups of relays, the said installation also comprising means for retaining at will the recording of at least one of the groups of relays when the said recording corresponds to a constant datum for a series of successive cards to be perforated, means for automatically deenergizing all of the relays of the other groups the recording of which corresponds to variable data, after each transfer to a card, the said means for retaining at will being adapted for the transfer of data to a sequence of cards in the absence of momentary operation of the keys of the keyboard by the operator, it being necessary only for the operator to strike the keyboard for transmitting variable data, whereby the single depression of the constant data effects the transfer of the constant data to a selected number of successive cards at the same time as the variable data is transferred thereto.

In testimony whereof I have affixed my signature.

CHARLES BOREL.